(12) United States Patent
Eguchi

(10) Patent No.: US 6,358,182 B1
(45) Date of Patent: Mar. 19, 2002

(54) DRIVING FORCE CONTROL UNIT FOR VEHICLES

(75) Inventor: Takahiro Eguchi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 16 days.

(21) Appl. No.: 09/613,584

(22) Filed: Jul. 10, 2000

(30) Foreign Application Priority Data

Jul. 8, 1999 (JP) ............................................ 11-194073

(51) Int. Cl.$^7$ .............................................. B60K 41/28
(52) U.S. Cl. ............................ 477/74; 477/93; 477/171
(58) Field of Search ............................. 477/93, 114, 45, 477/74, 94, 171

(56) References Cited

U.S. PATENT DOCUMENTS

| | | | | |
|---|---|---|---|---|
| 2,608,880 A | * | 9/1952 | Flinn | 477/94 |
| 4,526,065 A | * | 7/1985 | Rosen et al. | 477/93 |
| 4,644,826 A | * | 2/1987 | Kubo et al. | 477/93 X |
| 5,119,694 A | * | 6/1992 | Sato et al. | 477/93 |
| 5,609,543 A | * | 3/1997 | Aoki et al. | 477/45 |
| 5,916,061 A | * | 6/1999 | Koyama et al. | 477/171 X |

FOREIGN PATENT DOCUMENTS

| | | | |
|---|---|---|---|
| JP | 1-145243 | * | 6/1989 |
| JP | 1-244930 | | 9/1989 |
| JP | 11-141367 | | 5/1999 |

OTHER PUBLICATIONS

Patent Abstract of Japan, 01244930, Sep. 29,1989.
Patent Abstract of Japan, 09202159, Aug. 05, 1997.

* cited by examiner

Primary Examiner—Rodney H. Bonck
(74) Attorney, Agent, or Firm—Sughrue Mion, PLLC

(57) ABSTRACT

A driving force control unit for a vehicle, which allows transmission of driving force from a driving motor to driving wheels irrespective of releasing an accelerator pedal at a certain or lower vehicle speed when a transmission is selected to a running range, and which switches the magnitude of the driving force while the accelerator pedal is released at a vehicle speed no more than the certain vehicle speed between a greater condition and a smaller condition in accordance with depression of a brake pedal so that the driving force is made lower at a depression of the brake pedal than at a release of the brake pedal, wherein the driving force value in the greater condition at a certain or lower vehicle speed is changed according to the vehicle speed, and the change of the driving force value is characterized in that the driving force value becomes smaller as reaching from the vehicle speed at the maximum driving force value to the certain vehicle speed, and further switching the driving force, before stopping the vehicle, from the greater condition to the smaller condition is permitted merely in the vicinity of the certain vehicle speed.

4 Claims, 15 Drawing Sheets

Rotation in ① direction

Pulse phase difference

Rotation in ② direction

Pulse phase difference

Change of Vehicle speed during Idling running

Change of the Number of Engine speed during Idling running

Change of Speed ratio of Starting clutch during Idling running

Change of Driving force value during Idling running

Time chart during running (with brake pedal depressed during idling running at vehicle speed less than vicinity of a certain vehicle speed)

Change of Vehicle speed

Change of Driving force value

Time chart during running (with brake pedal depressed during idling running in vicinity of a certain vehicle speed)

Change of Vehicle speed

Change of Driving force value

DRIVING FORCE CONTROL UNIT FOR VEHICLES

FIELD OF THE INVENTION

The present invention relates to a driving force control unit for a vehicle, which is capable of switching driving force to be transmitted to driving wheels in accordance with depression of the brake pedal.

BACKGROUND OF THE INVENTION

In the prior art, there is known a vehicle in which driving force is transmitted to the driving wheels when the transmission is selected to a running range and the vehicle is in idling condition at a certain or lower vehicle speed including the condition that the vehicle stops. Such driving force is called "creep force", by which unintentional backward displacement of the vehicle on a slope is restricted or an improvement is made on the run at a traffic jam. In this conventional vehicle, creep force is generated even when the brake pedal is depressed in the idling condition at the certain or lower vehicle speed. To this end, there is a drawback in that such a vehicle requires strong brake pedal depression for stopping, compared to a vehicle without generating creep force. Further, since the creep force generated by the rotation of the engine is forcibly restricted by braking force, the vehicle is susceptible to vibrations or noise.

In order to solve this problem, Japanese Patent Publication No. 1-244930 (i.e., Japanese Patent Application No. 63-71520) discloses a control unit for a vehicular automatic clutch, which is applied to a control system for generating low dragging torque (creep force) when the transmission is selected to a running range and the vehicle moves at an extremely low speed. The control unit makes creep force lower at a depression of the brake pedal than at a release of the brake pedal. According to this disclosure, creep force is changed by the depression of the brake pedal from a high state (strong creep condition) to a low state (weak creep condition) so that the aforementioned problems, such as the strong brake pedal depression requirement and the vibrations during stops of the vehicle can be eliminated.

In Japanese Patent Publication No. 9-202159 (i.e., Japanese Patent Application No. 8-12457), there is disclosed a vehicle with a starting clutch, in which the starting clutch is half engaged so as to apply the vehicle with driving force (creep force) when the transmission is selected to a running range and the vehicle moves at an extremely low speed. In this vehicle, engaging state of the starting clutch is controlled in response to a braking operation of the driver so that driving force is made lower (in the weak creep condition) at a depression of the brake pedal than at a release of the brake pedal.

However, when creep force is decreased from the strong creep condition to the weak creep condition in accordance with depression of the brake pedal, driving force to be transmitted to the driving wheels lowers. The driver recognizes the reduction of the driving force as braking force. Therefore, if the brake pedal is depressed when the vehicle moves at a certain or lower vehicle speed with the engine being in idling condition, the vehicle receives braking force by the reduction of creep force as well as by the depression of the brake pedal. As a result, the driver feels unintentional deceleration of the vehicle.

Especially in the prior art vehicle, the difference of the creep force (difference of the driving force values) between the strong creep condition and the weak creep condition is set greater, in order to achieve various purposes such as restriction of the vehicle in the strong creep condition from unintentional backward displacement on a slope, noise reduction of the vehicle in the weak creep condition upon depression of the brake pedal, and the like. For this reason, when the driver depresses the brake pedal, he receives unintentional strong deceleration, which is more than the actual brake pedal depression and is recognized as an awkward feel.

SUMMARY OF THE INVENTION

With the foregoing drawback of the prior art in view, the present invention seeks to provide a driving force control unit for a vehicle, which prevents the driver's unintentional strong deceleration feel.

According to the present invention, there is provided a driving force control unit for a vehicle, which allows transmission of driving force from a driving motor to driving wheels irrespective of releasing an accelerator pedal at a certain or lower vehicle speed when a transmission is selected to a running range, and which switches the magnitude of the driving force while the accelerator pedal is released at a vehicle speed no more than the certain vehicle speed between a greater condition and a smaller condition in accordance with depression of a brake pedal so that the driving force is made lower at a depression of the brake pedal than at a release of the brake pedal, wherein the driving force value in said greater condition at a certain or lower vehicle speed is changed according to the vehicle speed, and the change of the driving force value is characterized in that the driving force value becomes smaller as reaching from the vehicle speed at the maximum driving force value to said certain vehicle speed, and further switching said driving force, before stopping the vehicle, from said greater condition to said smaller condition is permitted merely in the vicinity of said certain vehicle speed.

Also, there is provided a driving force control unit for a vehicle, which allows transmission of driving force from a driving motor to driving wheels irrespective of releasing an accelerator pedal at a certain or lower vehicle speed when a transmission is selected to a running range, and which switches the magnitude of the driving force while the accelerator pedal is released at a vehicle speed no more than the certain vehicle speed between a greater condition and a smaller condition in accordance with depression of a brake pedal so that the driving force is made lower at a depression of the brake pedal than at a release of the brake pedal, wherein the driving force control unit further comprises means for changing the driving force value in said greater condition at a certain or lower vehicle speed so that the driving force value is changed according to the vehicle speed, the change of the driving force value being characterized in that the driving force value becomes smaller as reaching from the vehicle speed at the maximum driving force value to said certain vehicle speed, and switching said driving force, before stopping the vehicle, from said greater condition to said smaller condition being permitted merely in the vicinity of said certain vehicle speed.

In such driving force control units, reduction of the driving force upon depressing the brake pedal is carried out only when the difference between the driving force values before and after decreasing the driving force becomes smaller.

Here, the term "a certain vehicle speed" indicates a vehicle speed just before the vehicle stops. Therefore, if a certain vehicle speed is 5 km/h as an example shown in the preferred embodiments and examples, the vehicle speed range "at a certain or lower vehicle speed" includes vehicle speeds from 0 km/h (when the vehicle stops) to 5 km/h.

Meanwhile, the "smaller condition" indicates a weak creep condition. However, the "smaller condition" includes not only a case that the absolute value of the driving force generated by the driving motor is made smaller, but also a case that the driving force to be transmitted to the driving wheels becomes zero by completely reducing the engaging force of a hydraulically engaging element such as a starting clutch.

The "vehicle speed" in the wording "changed according to the vehicle speed" includes vehicle speed itself and its equivalent parameters. For example, as shown in the preferred embodiments and examples, if the vehicle speed and the speed ratio of the starting clutch (speed ratio between the input and output sides of the starting clutch) are in corresponding relation, the driving force may be changed in accordance with the speed ratio. This is also included in the case "changed according to the vehicle speed".

Further, the term "vicinity" appeared in the wording "permitted merely in the vicinity of said certain vehicle speed" indicates a vehicle speed range from a certain vehicle speed to the vehicle speed approximately a half extent of the maximum driving force value, and "a certain vehicle speed" itself is also included in its vehicle speed range. The wording "permitted merely in" includes the following three cases: (1) permitting merely in a particular vehicle speed range within the vicinity of the certain vehicle speed; (2) permitting merely at a particular vehicle speed within the vicinity of the certain vehicle speed; and (3) permitting in all the vehicle speed range within the vicinity of the certain vehicle speed.

Here, judgement of the "vicinity" (judgement for smaller driving force values) may be carried out not only by the vehicle speed itself, but also by its equivalent parameters. For example, the judgement may be made based on the speed ratio between the input and output sides of the starting clutch or the hydraulic pressure command value controlling the engaging force of the starting clutch (driving force transmission capacity [or driving force value]) in consideration of a characteristic that such a hydraulic pressure command value changes corresponding to the vehicle speed (speed ratio). When a driving force value in each vehicle speed or speed ratio is calculated with the use of coefficients, which are determined and changed corresponding to the vehicle speed or the speed ratio, the judgement may be made based on these coefficients.

An automatic transmission with a fluid type torque converter is widely known in the field, which is made in combination of a fluid type torque converter as a driving force transmission means and a power transfer including a hydraulically engaging element such as a hydraulic clutch and a hydraulic brake. Such a fluid type torque converter is free from external control and has own characteristic in that the driving force value to be transmitted is decreased as the vehicle speed increases (the torque amplification factor is decreased when transmitting an input torque of the engine to the power transfer). In such case, switching between the strong creep condition and the weak creep condition is carried out by switching the engaging force (driving force transmission capacity) of the hydraulically engaging element included in the power transfer into the following two states; (1) complete engaging state (no sliding occurs), and (2) smaller or zero engaging force state (greater sliding). Further, in the strong creep condition, the characteristic of the driving force value to the vehicle speed recited in the claims is obtained without external control. In this case, the vicinity range at a certain or lower vehicle speed is determined in consideration of the torque amplification factor of the fluid type torque converter.

Here, the torque amplification factor of the fluid type torque converter indicates relations between the speed ratio of the fluid type torque converter (which is an index showing the degree of sliding, and is also an equivalent parameter of the vehicle speed in the case that the hydraulically engaging element is in complete engaging state) and the torque amplification factor. As the speed ratio is smaller, i.e., greater sliding and slower vehicle speed, the torque amplification factor becomes higher.

BRIEF DESCRIPTION OF THE DRAWINGS

FIG. 7 shows the control logic of the braking force control unit of FIG. 6, in which

FIG. 8 shows the controls of the driving force control unit, in which

FIG. 10 shows the controls of the braking force control unit, in which

FIG. 11 shows the controls of the driving force control unit, in which FIG. 11A shows a backward displacement detecting version, and FIG. 11B shows a vehicle movement detecting version, respectively;

FIG. 12 shows the controls of the driving motor stopping unit, in which FIG. 12A shows a backward displacement detecting version, and FIG. 12B shows a vehicle movement detecting version, respectively;

FIG. 13 shows a way of detecting backward displacement of the vehicle, in which

FIG. 14 is a time chart of a vehicle provided with a driving force control unit according to the invention, while the vehicle is running, in which

FIG. 15 is a time chart of a vehicle provided with a driving force control unit according to the invention, while the vehicle is running, in which FIG. 16 is a time chart of a vehicle provided with a driving force control unit according to the invention, while the vehicle is running, in which

DESCRIPTION OF THE PREFERRED EMBODIMENTS

A driving force control unit according to the present invention will be described with reference to the drawings.

Driving Force Control Unit
[Configuration of Driving Force Control Unit]

Figure 1:
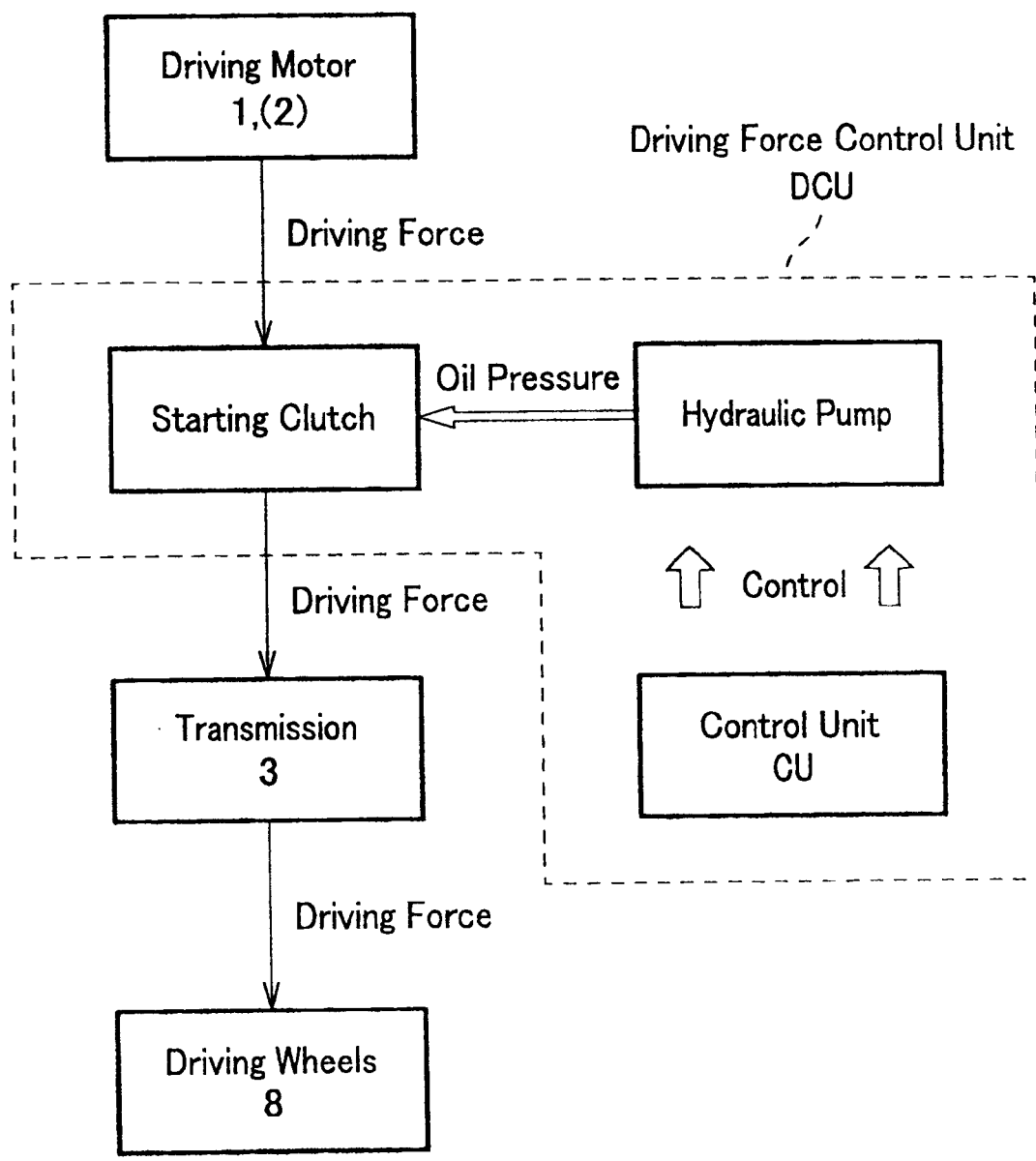
FIG. 1 is a block diagram showing a drive system of a vehicle on which a driving force control unit according to one embodiment of the invention is mounted.

As shown in FIG. 1, a driving force control unit DCU comprises a starting clutch and the like. In response to a control signal from a control unit CU, the driving force control unit DCU transmits driving force (creep force) generated at a driving motor 1 while idling to driving wheels 8 through a transmission 3 with the driving force set in a greater condition (strong creep condition) or a smaller condition (weak creep condition). A clutch as the starting clutch may be disposed on the input side of the transmission 3.

Combination of the driving force control unit DCU and the transmission 3 is exemplified by (1) the combination of the starting clutch as an essential part of the driving force control unit DCU and a belt-type continuously variable transmission (hereinafter referred to as CVT) as the transmission 3, (2) the combination of a fluid type torque converter as an essential part of the driving force control unit DCU and an power transfer as the transmission 3, and the like. Specifically, in the latter combination (2), the driving force control unit DCU comprises a fluid type torque converter and a hydraulically engaging element such as a hydraulic clutch (hydraulic brake) furnished to the power transfer.

In the combination (1), in order to create a greater condition and a smaller condition of driving force, the starting clutch (hydraulic multiple disc clutch) as an essential part of the driving force control unit DCU is supplied with pressure oil at a certain oil pressure value from a hydraulic pump, based on a control signal (hydraulic pressure command value) transmitted by the control unit CU. For example, the hydraulic pressure command value is transmitted to a linear solenoid valve for controlling the oil pressure value of the starting clutch.

When the oil pressure value from the hydraulic pump to the starting clutch is reduced, the pressing force of the clutch plate (engaging force) is lowered and a smaller driving force condition is achieved. Meanwhile, when the oil pressure value is increased, the pressing force of the clutch plate rises and a greater driving force condition is achieved.

In the combination (2), in order to create a greater condition and a smaller condition of driving force, the hydraulic clutch and the like furnished to the power transfer as an essential part of the driving force control unit DCU are supplied with pressure oil at a certain oil pressure value from the hydraulic pump, based on a hydraulic pressure command value transmitted by the control unit CU. The greater condition and the small condition are thus created.

Judgement is carried out whether or not the driving force in each condition takes a proper value. This can be carried out based on the speed ratio by the input and output sides of the starting clutch (the hydraulic clutch furnished to the power transfer, in the case of the combination (2)). When the driving force is judged to be greater than the proper value, the hydraulic pressure value from the hydraulic pump to the starting clutch may be lowered so that the driving force can be controlled to a proper magnitude.

Switching of the driving force is carried out in consideration of the vehicle speed, depression and release of the accelerator pedal, depression and release of the brake pedal, and the range position of the transmission . To this end, the vehicle is provided at least with means for detecting vehicle conditions, such as a vehicle speed meter for detecting vehicle speed, throttle switch for detecting conditions of accelerator pedal depression, brake switch for detecting conditions of brake pedal depression, and a positioning switch for detecting range position of the transmission.

According to the invention, the driving force value in the greater driving force condition is changed according to the vehicle speed. In the case of the combination (1), such control for changing the driving force value is achieved, for example by the following processes and with the provision of a table in the control unit CU showing relations between vehicle speed and oil pressure value supplied to the starting clutch. The vehicle speed detected by the vehicle speed meter is inputted into the control unit CU. Subsequently, based on the table, the control unit CU inputs a hydraulic pressure command value corresponding to the vehicle speed into a linear solenoid valve. Then, pressure oil is supplied to the starting clutch based on this hydraulic pressure command value. The control unit Cu outputs a hydraulic pressure command value by the input of a vehicle speed.

Meanwhile, in the case of the combination (2), the control for changing the driving force value in the greater condition in accordance with the vehicle speed is achieved without external control, because of the own characteristic of the fluid type torque converter. The vehicle speed-driving force value characteristic of the fluid type torque converter in the greater driving force condition takes the maximum when the vehicle speed is 0 km/h.

[Basic Control of Driving Force Control Unit while Running]

Basic control for the driving force control unit DCU while running will be described.

The driving force control unit DCU allows transmission of driving force from the driving motor to the driving wheels irrespective of releasing the accelerator pedal at a certain or lower vehicle speed when the transmission is selected to a running range, and it switches the magnitude of the driving force to a smaller condition if the brake pedal is depressed and to a greater condition if the brake pedal is released. From a signal of the brake switch, the control unit CU detects whether the brake pedal is depressed or not.

The reason for switching the driving force to the smaller condition when depressing the brake pedal BP is for facilitating stops of the vehicle as well as for preventing vibrations during the vehicle stops, by way of reducing the driving force (creep force) unnecessary for stopping the vehicle. Meanwhile, the reason for switching the driving force to the greater condition while releasing the brake pedal BP is for preparation of a starting operation or acceleration of the vehicle as well as for resisting a gentle slope without braking force. Switching of the driving force to the smaller condition is carried out for the purpose of reducing loads to the engine 1 and improved fuel consumption by way of reducing loads to the hydraulic pump of the starting clutch.

In this preferred embodiment, when the accelerator pedal is depressed and the transmission selects a running range, the driving force control unit DCU increases the pressing force of the clutch plate at the starting clutch irrespective of the condition whether the brake pedal is depressed or not. The driving force is therefore increased to the greater condition or more. In this case, sliding of the clutch plate at the starting clutch is none or little.

Figure 2:
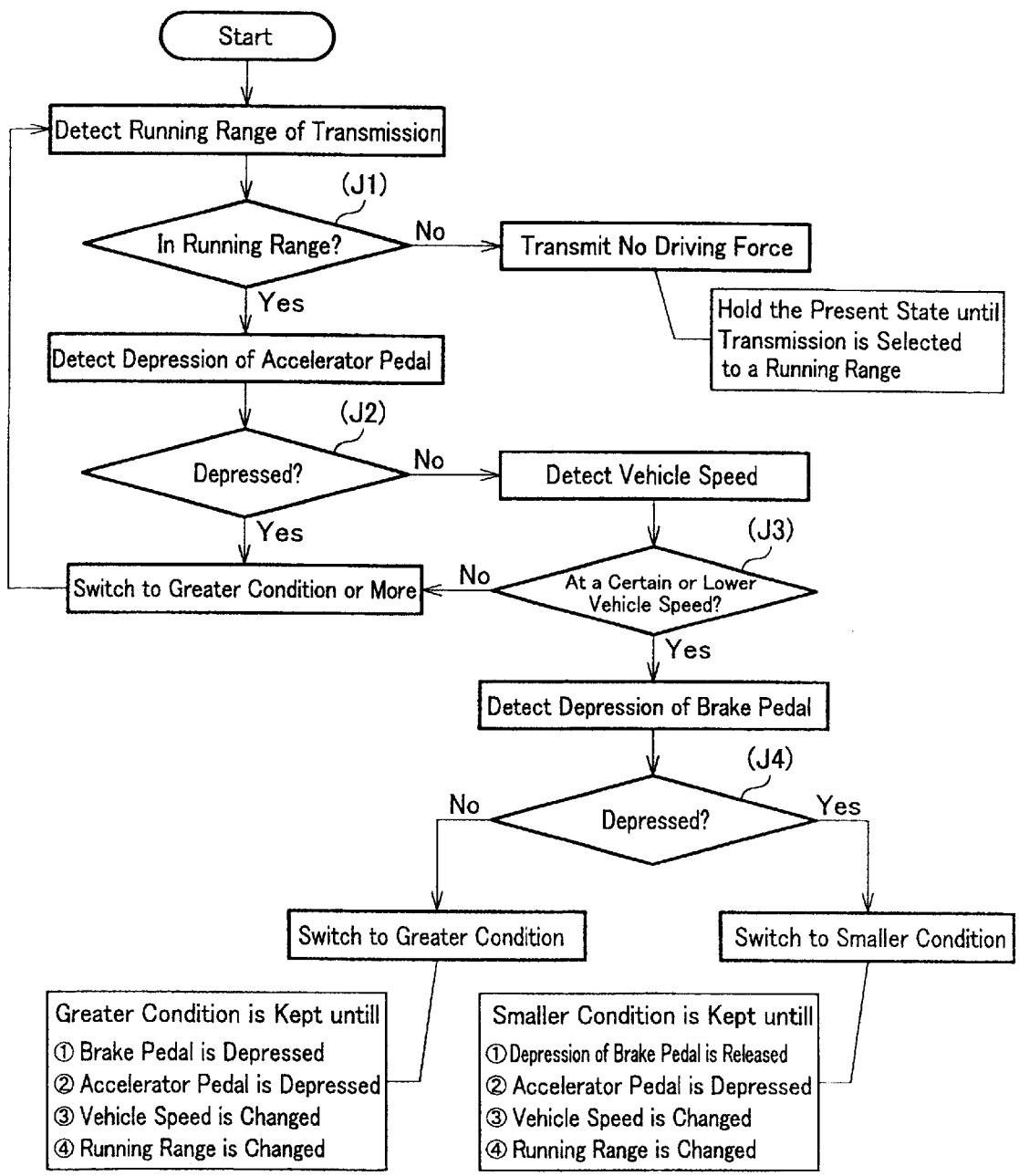
FIG. 2 is a flow chart showing a basic control example of the driving force control unit.

With reference to a flow chart of FIG. 2, basic control of the driving force control unit DCU while the vehicle is running will be described. As shown in FIG. 2, a running range of the transmission is detected and judged (J1) so that driving force is not transmitted to the driving wheels 8 (driving force is zero) unless in a running range. If the transmission selects a running range, depression of the accelerator pedal is detected and judged (J2). When the accelerator pedal is depressed, driving force is switched to the greater condition. When the accelerator pedal is not depressed, the vehicle speed is detected and judged (J3). Driving force is then switched to the greater condition or more if the vehicle speed is over a certain vehicle speed. If the vehicle speed is at the certain or lower vehicle speed, depression of the brake pedal BP is detected and judged (J4). Driving force is switched to the greater condition unless the brake pedal BP is depressed. Meanwhile, driving force is switched to the smaller condition if the brake pedal BP is depressed.

[Control of Driving Force Value in Greater Driving Force Condition]

Figure 3:
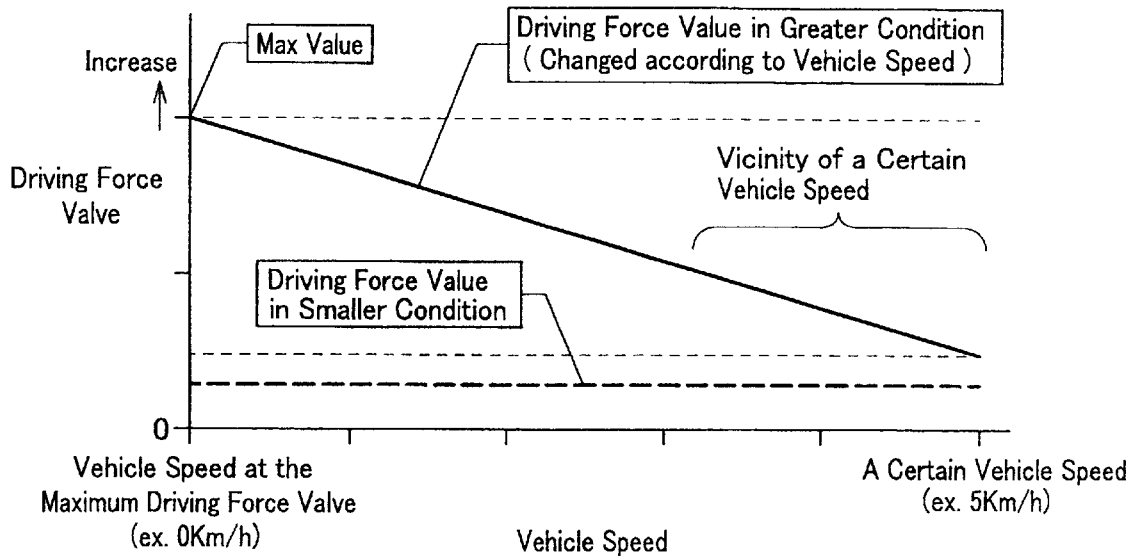
FIG. 3 exemplifies relations between vehicle speed and driving force, value regarding the driving force control unit.

The driving force control unit DCU changes the driving force value in the greater driving force condition according to the vehicle speed. As best seen in FIG. 3, the driving force control unit DCU controls the driving force value so as to present a characteristic in that the driving force value becomes smaller as reaching from the vehicle speed at the maximum driving force value to the certain vehicle speed. For example, the vehicle speed at the maximum driving force value is 0 km/h, and the certain vehicle speed is 5 km/h. In this figure, the driving force value decreases rectilinearly in accordance with the vehicle speed. However, it may decrease to draw a curving figure. In the case of the aforementioned combination (1), i.e., the vehicle provided with an automatic transmission in combination of CVT as the transmission 3 and the starting clutch, control is made on the hydraulic pressure value of the starting clutch so as to obtain the characteristic in that the driving force value decreases in accordance with the vehicle speed. Meanwhile, in the case of the aforementioned combination (2), i.e., the vehicle with a fluid type torque converter, such a fluid type torque converter is free from external control and originally has own characteristic in that the driving force value decreases in accordance with the vehicle speed.

The relations between vehicle speed and driving force value (FIG. 3) correspond to the table provided at the control unit CU.

[Switching to Smaller Driving Force Condition]

The driving force control unit DCU switches driving force from the greater condition to the smaller condition if the brake pedal is depressed while the driving force is in the greater condition. The switching of the driving force from the greater condition to the smaller condition is permitted merely in the vicinity of a certain vehicle speed at a certain or lower vehicle speed. Such a restriction is required in order to prevent unintentional strong deceleration of the vehicle. This is because if switching to the smaller condition is permitted while greater driving force difference (difference of the driving force values) exists between the greater driving force condition and the smaller driving force condition, driving force suddenly decreases with the driver's brake pedal operation. As a result, the driver receives unintentional strong deceleration, which is greater than the amount of the brake pedal depression. The restriction is also required in order to prevent a momentary backward displacement of the vehicle.

Here, the "vicinity of a certain vehicle speed" where switching of the driving force is carried out indicates a vehicle speed range from the certain vehicle speed (5 km/h) to the vehicle speed approximately a half extent of the maximum driving force value, and "a certain vehicle speed" itself is also included in its vehicle speed range. Difference between the driving force values in the greater driving force condition and the smaller driving force condition is small in this vehicle speed range. Therefore, the driver does not receive any unintentional strong deceleration even if the driving force is switched to the smaller condition upon depressing the brake pedal.

Switching of the driving force includes the following three cases: (1) switching is permitted merely in a particular vehicle speed range within the vicinity of the certain vehicle speed; (2) switching is permitted merely at a particular vehicle speed within the vicinity of the certain vehicle speed; and (3) switching is permitted in all the vehicle speed range within the vicinity of the certain vehicle speed.

Figure 4:
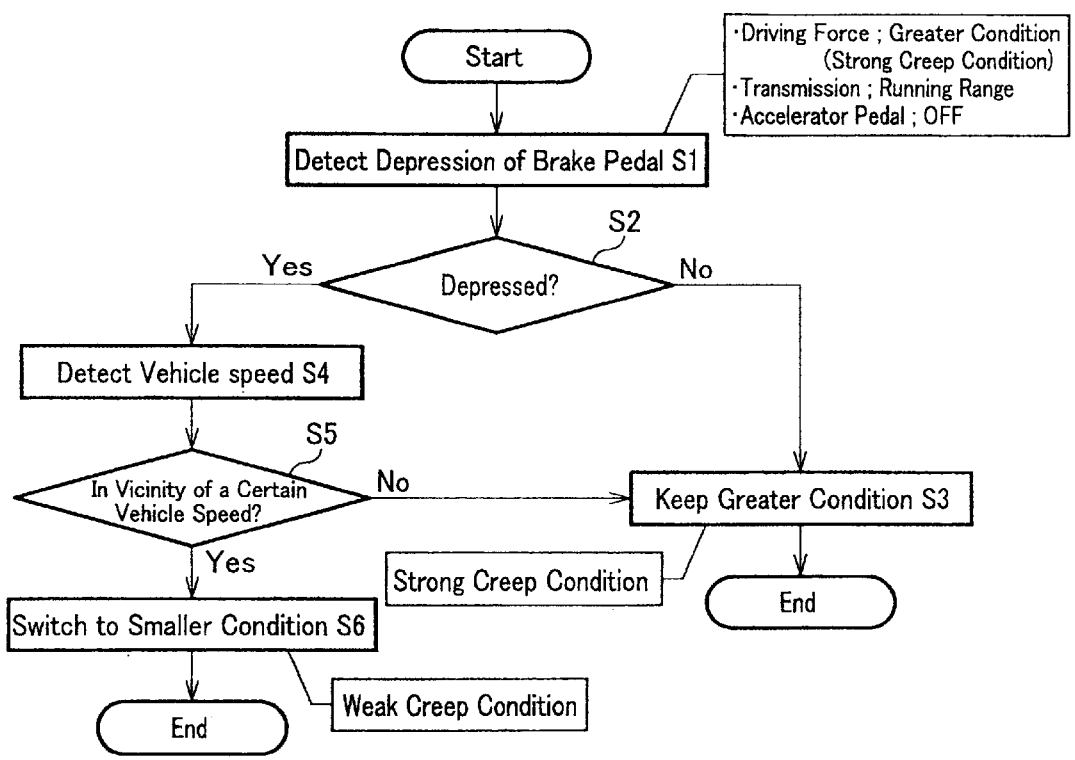
FIG. 4 shows a flow chart when driving force is switched to the smaller condition in the vicinity of a certain vehicle speed.

With reference to FIG. 4, control of the driving force control unit DCU when switching the driving force in the vicinity of the certain vehicle speed will be described. Here, the driving force is in the greater condition, the transmission is selected to a running range, and the accelerator pedal is released.

As shown in FIG. 4, depression of the brake pedal is detected (S1) and judged (S2). The greater condition is retained unless the brake pedal is depressed (S3). On the contrary, if the brake pedal is depressed, the vehicle speed is detected (S4). Subsequently, judgement is carried out as to whether or not the vehicle speed is in the vicinity of the certain vehicle speed (S5). Unless in the vicinity of the certain vehicle speed, the greater condition is retained (S4) so that the driver does not receive any unintentional strong deceleration. If the vehicle speed is in the vicinity of the certain vehicle speed, the driving force is switched to the smaller condition (S6). Since difference of the driving force values between the greater condition and the smaller condition is small, the driver does not receive any unintentional strong deceleration even if the driving force is switched to the smaller condition.

Specifically, the driving force control unit DCU actuates so as to decrease the driving force from the greater condition to the smaller condition under the following two circumstances.

Here, the transmission is selected to a running range, and the accelerator pedal is released.

For example, (1) when the vehicle climbs up a slope by inertia and the vehicle speed gradually decreases without operating the brake pedal, the driving force is switched to the greater condition at a certain vehicle speed (5 km/h). When the driver depresses the brake pedal while the vehicle speed further decreases gradually and the vehicle speed is in the vicinity of the certain vehicle speed, the driving force is decreased to the smaller condition by the depression of the brake pedal. Unless in the vicinity of the certain vehicle speed, the driving force is kept in the greater condition.

For example, (2) in order to start the vehicle by the driving force in the greater condition, depression of the brake pedal is released while the vehicle stops with the brake pedal depressed, and the driving force is changed to the greater condition. If the brake pedal is depressed before the vehicle speed increases over the certain vehicle speed, the driving force decreases to the smaller condition on condition that the vehicle speed at the depression of the brake pedal is in the vicinity of the certain vehicle speed. The driving force in the greater condition is kept unless the vehicle speed is in the vicinity of the certain vehicle speed.

In both cases (1) and (2), the driving force control unit DCU switches the driving force to the smaller condition on condition that the difference of the driving force between the greater condition and the smaller condition is smaller (in the vicinity of the certain vehicle speed). Since braking force resulting from the reduced driving force is smaller, the driver does not receive unintentional strong deceleration even if the driving force is switched to the smaller condition by the driver's brake pedal operation.

If the difference of the driving force between the greater condition and the smaller condition is greater (not in the vicinity of the certain vehicle speed), the driver receives unintentional strong deceleration by decreasing the driving force since braking force resulting from the reduced driving force affects the vehicle. Moreover, in an up slope, since the driving force against the slope decreases instantly, the vehicle often and momentarily displaces backwards. For this reason, reduction of the driving force is not carried out unless the vehicle speed is in the vicinity of the certain vehicle speed.

EXAMPLES

The present invention will be described in greater detail in connection with the following examples. However, it would be understood that the present invention is not limited by such specific examples.

System Configuration of Vehicle and Others

Figure 5:
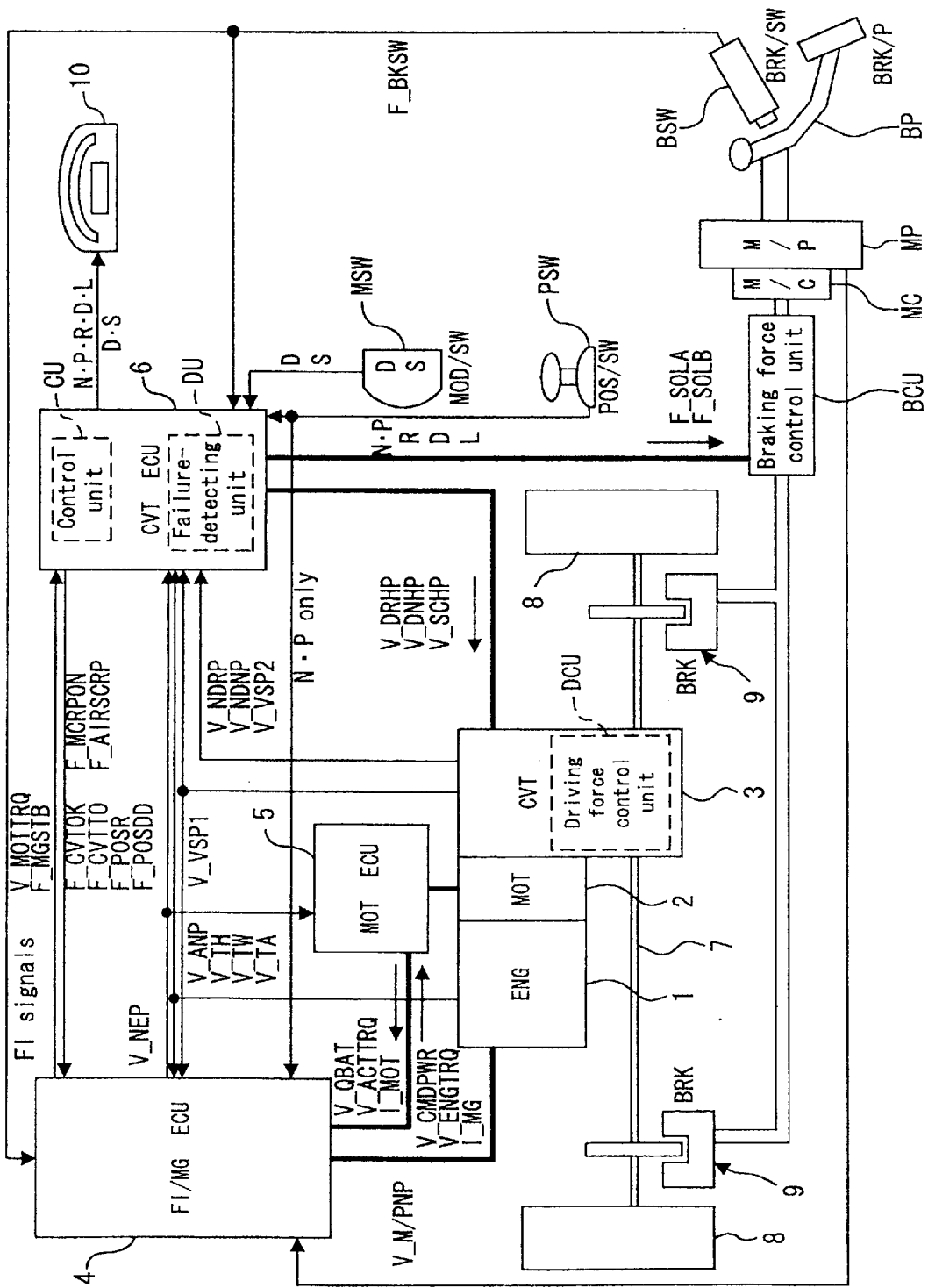
FIG. 5 shows a system configuration of a vehicle provided with a driving force control unit according to one example of the invention.

The system configuration of a vehicle on which is mounted a driving force control unit according to the present invention (hereinafter referred to as a "vehicle") will be described with reference to FIG. 5. The vehicle is a hybrid type vehicle having an engine 1 and an electric motor 2 as a driving motor, and is provided with CVT 3 as a transmission. The engine 1 is an internal combustion engine operable by gasoline and the like, and the electric motor 2 is operable by electricity.

[Engine (Driving Motor), CVT (Transmission) and Motor (Driving Motor)]

The engine 1 is controlled at a fuel injection electronic control unit (hereinafter referred to as FI ECU). The FI ECU is integrally constructed with a management electronic control unit (hereinafter referred to as MG ECU), and it is incorporated in a fuel injection/management electronic control unit 4 (hereinafter referred to as FI/MG ECU). The motor 2 is controlled at a motor electronic control unit 5 (hereinafter referred to as MOT ECU). Further, the CVT 3 is controlled at a CVT electronic control unit 6 (hereinafter referred to as CVT ECU).

Figure 6:
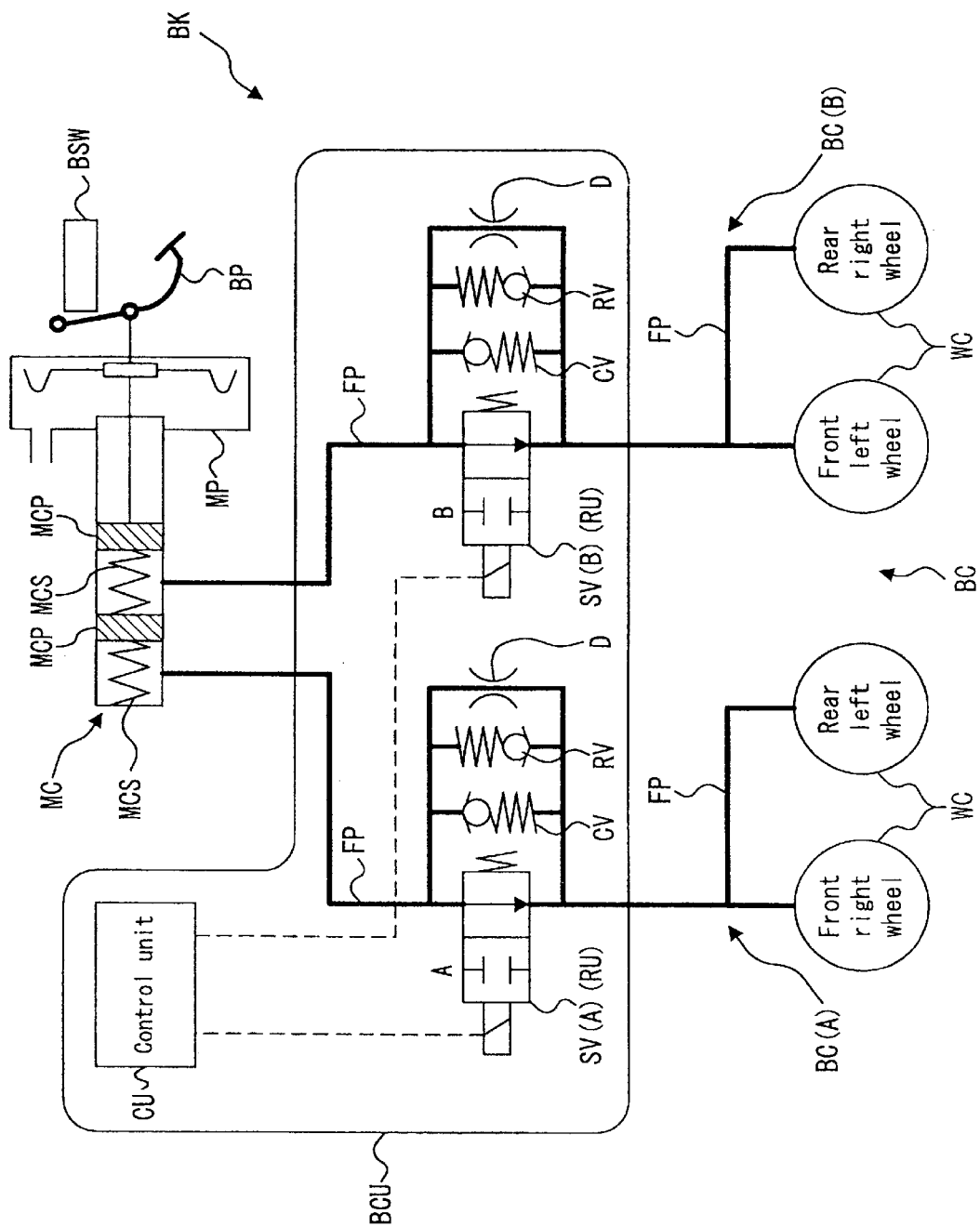
FIG. 6 shows a configuration of a braking force control unit according to one example of the invention.

A drive axle 7 provided with driving wheels 8, 8 is mounted to the CVT 3. Each driving wheel 8 is provided with a disc brake 9, which includes a wheel cylinder WC and the like (FIG. 6). The wheel cylinders WC of the disc brakes 9,9 are connected to a master cylinder MC through a braking force control unit BCU. When the driver depresses the brake pedal BP, brake pedal load generated is transmitted to the master cylinder MC through the master power MP. The brake switch BSW detects whether the brake pedal BP is depressed or not.

The engine 1 is an internal combustion engine, which makes use of thermal energy. The engine 1 drives the driving wheels 8, 8 through the CVT 3 and the drive axle 7. In order to improve fuel consumption, the engine 1 may be automatically stopped while the vehicle stops. For this reason, the vehicle is provided with a driving motor stopping unit for automatically stopping the engine 1 when a certain automatic engine stop condition is satisfied.

The motor 2 has an assist mode for the assist of the engine drive with the use of electric energy from a non-shown battery. The motor 2 has a regeneration mode for converting the kinetic energy derived from the rotation of the drive axle 7 into electric energy. When the engine does not require the assist from the assist mode (such as for starting on a down slope or deceleration of the vehicle), the thus converted electric energy is stored in a non-shown battery. Further, the motor 2 has an actuation mode for actuating the engine 1.

The CVT 3 includes an endless belt winded between a drive pulley and a driven pulley so as to enable continuously variable gear ratio by changing a winding radius of the endless belt. Change of the winding radius is achieved by changing each pulley width. The CVT 3 engages a starting clutch and an output shaft so as to transmit the output of the engine 1 converted by the endless belt into the drive axle 7 through gears at the output side of the starting clutch. The vehicle equipped with the CVT 3 enables creep running while the engine 1 is idling, and such a vehicle requires a driving force control unit DCU for decreasing driving force to be utilized for the creep running.

[Driving Force Control Unit]

The driving force control unit DCU is incorporated in the CVT 3. The driving force control unit DCU variably controls the driving force transmission capacity of the starting clutch, thereby changing creep force. The driving force control unit DCU comprises the starting clutch furnished to the CVT 3 and CVT ECU 6 to be described later.

The driving force control unit DCU controls the driving force transmission capacity of the starting clutch and switches to the predetermined driving force in each creep condition when the CVT ECU 6 judges conditions (hereinafter described) required for a weak creep condition, middle creep condition, strong creep condition or a strong creep condition for driving. Switching of the driving force transmission capacity may be carried out while the vehicle stops. The driving force control unit DCU changes the driving force value in the strong creep condition according to the vehicle speed. As shown in FIG. 14, the driving force value in the strong creep condition becomes the maximum at the vehicle speed of 0 km/h (when the vehicle stops) and the minimum in the vicinity of the certain vehicle speed (5 km/h). Further, the driving force control unit DCU increases the driving, force transmission capacity of the starting clutch and switches to the strong creep condition if a movement or backward displacement of the vehicle is detected upon starting the vehicle on a slope. The CVT ECU 6 judges conditions for switching the creep force, and it transmits a hydraulic pressure command value to a linear solenoid valve of the CVT 3, where the engagement hydraulic pressure of the starting clutch is controlled. In the driving force control unit DCU, the engagement force of the starting clutch is adjusted at the CVT 3 based on the hydraulic pressure command value. The driving force transmission capacity is therefore changed and the creep force is adjusted. Since the driving force control unit DCU decreases the driving force, improved fuel consumption of the vehicle is achieved. Fuel consumption of the vehicle is improved by the reduction of loads at the engine 1, a hydraulic pump of the starting clutch and the like. The term "driving force transmission capacity" indicates the maximum driving force (driving torque) transmitted by the starting clutch. Therefore, if the driving force generated at the engine 1 is greater than the driving force transmission capacity, the starting clutch does not transmit the remaining driving force, which is beyond the driving force transmission capacity, to driving wheels 8,8 . . . .

When a failure-detecting unit DU detects malfunction of the braking force control unit BCU, operations of the driving force control unit DCU is restricted.

According to this embodiment, creep force of the vehicle includes three conditions, i.e., a strong condition, weak condition, and a middle condition between the strong and weak conditions. The driving force transmission capacity at each condition is predetermined so as to be greater in the strong condition, less in the weak condition, and intermediate in the middle condition.

In this embodiment, the strong condition (strong creep force) is referred to as a strong creep condition, and the weak condition (weak creep force) is referred to as a weak creep condition, and further the middle condition (intermediate creep force) is referred to as a middle creep condition. Further, the strong creep condition includes a strong creep condition at a vehicle speed of 5 km/h or lower and a strong creep condition over the vehicle speed of 5 km/h. The former (strong creep condition at a vehicle speed of 5 km/h or lower) is merely referred to as a strong creep condition, and the latter (strong creep condition over the vehicle speed of 5 km/h) is referred to as a strong creep condition for driving.

Figure 14A:
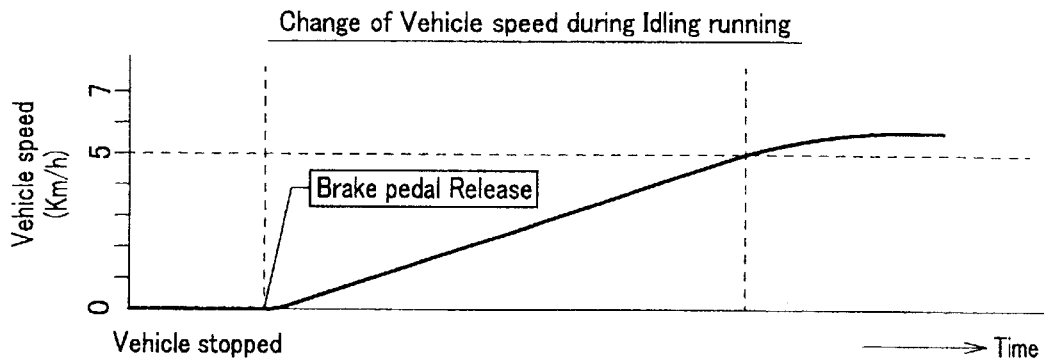
FIG. 14A shows relations between elapsed time during idling running and vehicle speed.
Figure 14B:
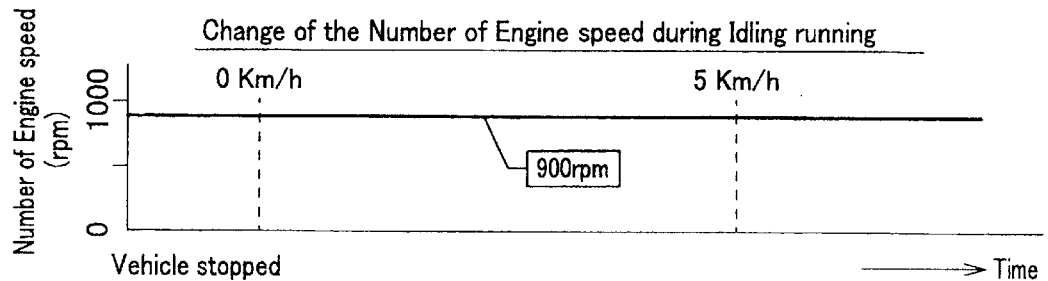
FIG. 14B shows relations between elapsed time during idling running and the number of engine speed.

In the strong creep condition, driving force is adjusted so as to keep the vehicle stationary on a slope having an inclination angle of 5 degrees. However, in the strong creep condition, the driving force value is decreased according to the vehicle speed (FIG. 14A and FIG. 14B). The strong creep condition is achieved when the accelerator pedal is released at a certain or lower vehicle speed (idling condition) and the positioning switch PSW selects a running range and further the brake pedal BP is released. The wording "the positioning switch PSW selects a running range" means that the transmission is selected to a running range.

Figure 14C:
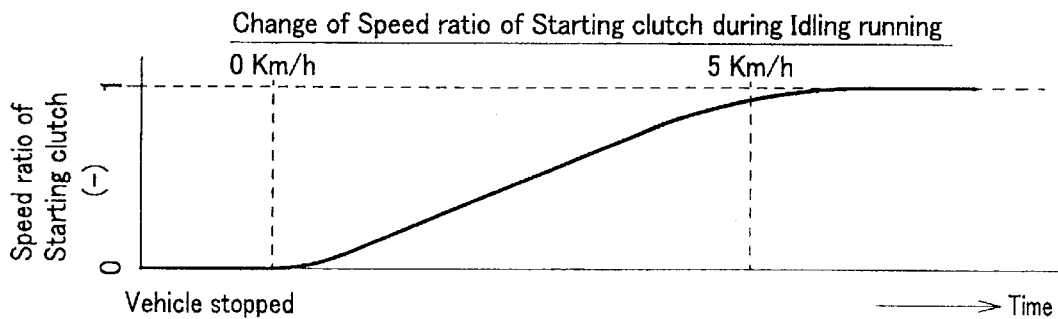
FIG. 14C shows relations between elapsed time during idling running and speed ratio of the starting clutch.
Figure 14D:
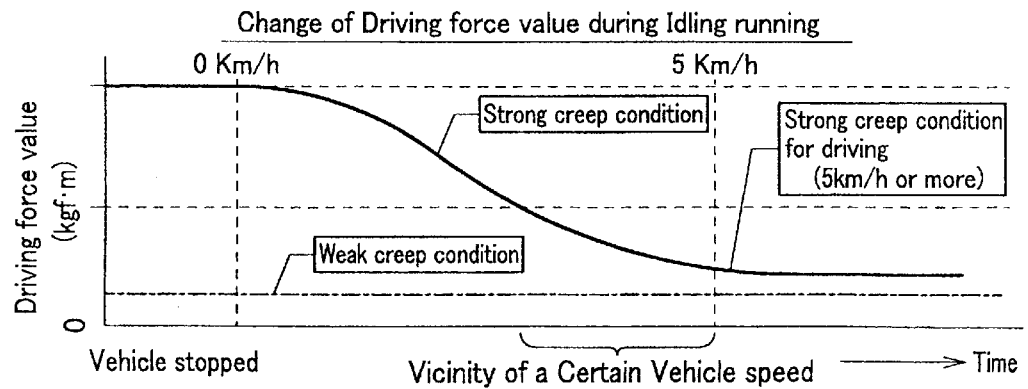
FIG. 14D shows relations between elapsed time during idling running and driving force value, respectively.

In the strong creep condition for driving, driving force is adjusted to be less than that in the strong creep condition (FIG. 14D). The strong creep condition for driving is a preliminary condition before switching to the weak creep condition. The strong creep condition for driving is not included in the greater condition of the claims.

In the middle creep condition, driving force is controlled substantially to a half extent between the strong creep condition and the weak creep condition. The middle creep condition is an intermediate condition when driving force is stepwise decreased in the process of switching from the strong creep condition to the weak creep condition.

In the weak creep condition, almost no driving force is obtained. The weak creep condition is achieved when the brake pedal BP is depressed. In the weak creep condition, the vehicle stops or moves at an extremely low speed.

[Positioning Switch]

Range positions of the positioning switch PSW are selected by a shift lever. Such range positions are selected from P range to be used for parking the vehicle, N range as a neutral range, R range for backward running, D range to be used for a normal run, and L range to be used for obtaining a sudden acceleration or strong engine brake. The term "running range" indicates a range position, at which the vehicle can move. In this vehicle, the running range includes D range, L range and R range. Further, when the positioning switch PSW selects D range, D mode as a normal running mode and S mode as a sports mode can be selected by a mode switch MSW. Information of the positioning switch PSW and the mode switch MSW is transmitted to the CVT ECU 6 and further to a meter 10. The meter 10 indicates the range information and the mode information selected by the positioning switch PSW and the mode switch, respectively.

In this embodiment, reduction of the creep force (switching operation to the middle creep condition and the weak creep condition) is carried out while the positioning switch PSW is in D range or L range. The strong creep condition is retained while the positioning switch PSW is in R range. Driving force is not transmitted to the driving wheels 8, 8 while the positioning switch PSW is in N range or P range. However, the driving force transmission capacity is decreased and the driving force is substantially switched to the weak creep condition. This will be described later in greater detail.

[ECU and Others]

FI ECU contained in the FI/MG ECU 4 controls the amount of fuel injection so as to achieve the optimum air fuel ratio, and it also generally controls the engine 1. Various kinds of information such as a throttle angle and conditions of the engine 1 is transmitted to the FI ECU such that the engine 1 is controlled based on such information. The MG ECU contained in the FI/MG ECU 4 mainly controls the MOT ECU 5 as well as judges automatic engine stop conditions and automatic engine actuation conditions. The MG ECU receives information as to conditions of the motor 2 and other information such as conditions of the engine 1 from the FI ECU, and based on such information it sends instructions about mode switching of the motor 2 to the MOT ECU 5. Further, the MG ECU receives information such as conditions of the CVT 3, conditions of the engine 1, range information of the positioning switch PSW, conditions of the motor 2 and the like, and based on such information it judges whether the engine 1 should be automatically stopped or automatically actuated.

The MOT ECU 5 controls the motor 2 based on a control signal from the FI/MG ECU 4. The control signal from the FI/MG ECU 4 includes mode information instructing actuation of the engine 1 by the motor 2, assistance of the engine actuation or regeneration of electric energy, and an output required value to the motor 2, and the MOT ECU 5 sends an order to the motor 2 based on such information. Further, the MOT ECU 5 receives information from the motor 2 and transmits information such as the amount of generated energy and the capacity of the battery to the FI/MG ECU 4.

The CVT ECU 6 controls the transmission gear ratio of the CVT 3, the driving force transmission capacity of the starting clutch and the like. Various kinds of information such as conditions of the CVT 3, conditions of the engine 1, range information of the positioning switch PSW and the like is transmitted to the CVT ECU 6, and based on such information the CVT ECU 6 transmits a signal to the CVT 3, the signal of which includes control of hydraulic pressure of each cylinder provided at the drive pulley and the driven pulley of the CVT 3, and control of hydraulic pressure of the starting clutch. As shown in FIG. 6, the CVT ECU 6 comprises a control unit CU for the ON/OFF control (shut-off/communicate) of the solenoid valves SV(A), SV(B) which function as braking force retaining means RU of the braking force control unit BCU. The CVT ECU 6 transmits a signal for ON and OFF the solenoid valves SV(A), SV(B) to the braking force control unit BCU. Further, the CVT ECU 6 judges switching of the creep force as well as judges whether the driving force should be increased as a result of detecting a movement (or a backward displacement) of the vehicle while the braking force control unit BCU actuates. Information of such judgement is transmitted to the driving force control unit DCU of the CVT 3. The CVT ECU 6 comprises a failure-detecting unit DU for the purpose of detecting malfunction of the braking force control unit BCU.

The CVT ECU 6 judges switching of the creep force as well as judges the increment of the driving force upon detecting a movement (or backward displacement) of the vehicle, and based on the judgement, it transmits a hydraulic pressure command value to a linear solenoid valve controlling the engagement hydraulic pressure of the starting clutch.

[Brake (Braking Force Control Unit)]

The disk brakes 9, 9 are constructed such that a disk rotor rotatable with the driving wheel 8 is pressed between the brake pads moved by the wheel cylinder WC (FIG. 5) and braking force is obtained by the frictional force therebetween. Brake fluid pressure within the master cylinder MC is transmitted to the wheel cylinders WC through the braking force control unit BCU.

The braking force control unit BCU continuously retains brake fluid pressure within a wheel cylinder WC, i.e. braking force after depression of the brake pedal BP is released. The braking force control unit BCU comprises a control unit CU within the CVT ECU 6. Construction of the braking force control unit BCU will be described later in greater detail with reference to FIG. 6.

ON/OFF operation of the solenoid valve is meant as follows: In the normally open type solenoid valve, when the solenoid valve is ON, the solenoid valve closes to a shut-off position where a flow of brake fluid is shut off, and when the solenoid valve is OFF, the solenoid valve opens to a communicating position where a flow of brake fluid is allowed. Meanwhile, in the normally closed type solenoid valve, when the solenoid valve is ON, the solenoid valve opens to a communicating position where a flow of brake fluid is allowed, and when the solenoid valve is OFF, the solenoid valve closes to a shut-off position where a flow of brake fluid is shut off. As will be described later, solenoid valves SV(A), SV(B) in this example are of normally open type. A driving circuit within the control unit CU carries out or ceases a supply of electric currents to respective coils of the solenoid valves SV(A), SV(B) so as to ON and OFF the solenoid valves.

A master cylinder MC is a device for converting the brake pedal depression into hydraulic pressure. In order to assist the brake pedal depression, a master power MP is provided between the master cylinder MC and the brake pedal BP. The master power MP enhances braking force by way of applying negative pressure of the engine 1 or compressed air to the driver's brake pedal depression force. A brake switch BSW is provided at the brake pedal BP so as to detect whether or not the brake pedal BP is depressed.

[Driving Motor Stopping Unit]

The driving motor stopping unit incorporated in the vehicle is constructed by the FI/MG ECU and others. The driving motor stopping unit enables an automatic engine stop operation while the vehicle stops. The automatic engine stop conditions are judged at the FI/MG ECU 4 and the CVT ECU 6. The automatic engine stop conditions will be described later. When all of the automatic engine stop conditions are satisfied, the FI/MG ECU 4 sends an engine stop order to the engine 1 so as to automatically stop the engine 1. Since the driving motor stopping unit automatically stops the engine 1, improved fuel consumption of the vehicle is achieved.

The FI/MG ECU 4 and the CVT ECU 6 judges automatic engine actuation conditions while the driving motor stopping unit automatically stopping the engine 1. When all of the automatic engine actuation conditions are satisfied, the FI/MG ECU 4 sends an engine actuation order to the MOT ECU 5. The MOT ECU 5 further transmits an engine actuation order to the motor 2. The motor 2 then automatically actuates the engine 1, and at the same time driving force is switched to the strong creep condition. The automatic engine actuation conditions will be described later.

Further, when the failure-detecting unit DU detects malfunction of the braking force control unit BCU, operation of the driving motor stopping unit is prohibited.

[Signals]

Signals to be transmitted and received in this system will be described. With reference to FIG. 5, the letter "F__" in front of each signal indicates that the signal is flag information, which is either 0 or 1. The letter "V__" indicates that the signal is numerical information (unit is optional), and the letter "I__" indicates that the signal includes plural kinds of information.

A signal transmitted from the FI/MG ECU 4 to the CVT ECU 6 will be described. V_MOTTRQ represents an output torque value of the motor 2. F_MGSTB is a flag showing whether all of the engine stop conditions judged at the FI/MG ECU 4 are satisfied. If all the conditions are satisfied, the numeral 1 is given, and if not, the numeral 0 is given. The automatic engine stop conditions regarding F_MGSTB will be described later. When F_MGSTB and F_CVTOK (hereinafter described) are both turned to 1, the engine 1 is automatically stopped. When one of these flags is turned to 0, the engine 1 is automatically actuated.

A signal transmitted from the FI/MG ECU 4 to the CVT ECU 6 and the MOT ECU 5 will be described. V_NEP represents engine speed.

A signal transmitted from the CVT ECU 6 to the FI/MG ECU 4 will be described. F_MCRPON is a flag whether or not driving force is in the middle creep condition. The numeral 1 is given in the middle creep condition, and if not, the numeral 0 is given. When F_MCRPON is 1, the engine 1 is required to blow middle air in the middle creep condition (weaker air than that in the strong creep condition). F_AIRSCRP is a strong air demand flag in the strong creep condition. If strong air is required in the strong creep condition, the numeral 1 is given, and if not, the numeral 0 is given. When both F_MCRPON and F_AIRSCRP are 0, FI/MG ECU 4 blows weak air in the weak creep condition. In order to keep the engine idle speed at a certain level regardless of the driving force in the strong creep condition, middle creep condition or the weak creep condition, output of the engine should be adjusted by way of blowing corresponding air to the strong creep condition, middle creep condition or the weak creep condition. When driving force is in the strong creep condition and a load of the engine 1 is higher, a strong air blow (strong air in the strong creep condition) is required. The term "air blow" means the supply of air from an air passage by-passing a throttle valve of the engine 1 to an intake pipe positioned at a downstream of the throttle valve. Air is adjusted by controlling degrees of opening of the air passage.

F_CVTOK is a flag showing whether all of the engine stop conditions judged at the CVT ECU 6 are satisfied. If all the conditions are satisfied, the numeral 1 is given, and if not, the numeral 0 is given. The automatic engine stop conditions regarding F_CVTOK will be described later. F_CVTTO is a flag showing whether the oil temperature of the CVT 3 is over a certain value. If the oil temperature is at the certain value or more, the numeral 1 is given, and if the oil temperature is below the value, the numeral 0 is given. The oil temperature of the CVT 3 is obtained from an electrical resistance value of the linear solenoid valve controlling hydraulic pressure of the starting clutch at the CVT 3. F_POSR is a flag showing a condition whether the positioning switch PSW is selected in R range. If the positioning switch PSW selects R range, the numeral 1 is given, and if not, the numeral 0 is given. F_POSDD is a flag showing a condition whether the positioning switch PSW selects D range and the mode switch MSW selects D mode. If D range and D mode (D range/D mode) are selected, the numeral 1 is given, and if not, the numeral 0 is given. When the FI/MG ECU 4 does not receive any information indicating D range/D mode, R range, P range or N range, the FI/MG ECU 4 judges that either D range/S mode or L range is selected.

A signal transmitted from the engine 1 to the FI/MG ECU 4 and the CVT ECU 6 will be described. V_ANP represents a negative pressure value at the intake pipe of the engine 1. V_TH represents a throttle angle. V_TW represents a temperature of the cooling water at the engine 1. V_TA represents the intake temperature of the engine 1. The brake fluid temperature in the braking force control unit BCU disposed within the engine compartment is obtained from the intake temperature. This is because both temperatures change with respect to the temperature at the engine compartment.

A signal transmitted from the CVT 3 to the FI/MG ECU 4 and the CVT ECU 6 will be described. V_VSP1 represents a vehicle speed pulse from one of two vehicle speed pickups provided in the CVT 3. Vehicle speed is calculated based on this vehicle speed pulse.

A signal transmitted from the CVT 3 to the CVT ECU 6 will be described. V_NDRP represents a pulse showing the number of revolutions of the drive pulley provided at the CVT 3. V_NDNP represents a pulse showing the number of revolutions of the driven pulley provided at the CVT 3. V_VSP2 represents a vehicle speed pulse from the other vehicle speed pickup at the CVT 3. V_VSP2 is more accurate than V_VSP1, and V_VSP2 is used for calculating the amount of clutch slipping at the CVT 3.

A signal transmitted from the MOT ECU 5 to the FI/MG ECU 4 will be described. V_QBAT represents a remaining capacity of the battery. V_ACTTRQ represents an output torque value of the motor 2, which is the same as V MOTTRQ. I_MOT represents information such as the amount of generated energy of the motor 2 showing electric loading. The motor 2 generates all the electric power consumed for the vehicle including the electric power for driving the motor.

A signal transmitted from the FI/MG ECU 4 to the MOT ECU 5 will be described. V_CMDPWR represents an output required value to the motor 2. V_ENGTRQ represents an output torque value of the engine 1. I_MG represents information such as an actuation mode, assist mode and a regeneration mode with respect to the motor 2.

A signal transmitted from the master power MP to the FI/MG ECU 4 will be described. V_M/PNP represents a negative pressure detected value at a constant pressure chamber of the master power MP.

A signal transmitted from the positioning switch PSW to the FI/MG ECU 4 will be described. N or P is transmitted as positioning information when the positioning switch PSW selects either N range or P range.

A signal transmitted from the CVT ECU 6 to the CVT 3 will be described. V_DRHP represents a hydraulic pressure command value transmitted to the linear solenoid valve, which controls hydraulic pressure within the cylinder of the drive pulley at the CVT 3. V_DNHP represents a hydraulic pressure command value transmitted to the linear solenoid valve, which controls hydraulic pressure within the cylinder of the driven pulley at the CVT 3. The transmission gear ratio of the CVT 3 is changed by V_DRHP and V_DNHP. V_SCHP represents a hydraulic pressure command value transmitted to the linear solenoid valve, which controls the hydraulic pressure of the starting clutch at the CVT 3. The engaging force of the starting clutch (driving force transmission capacity) is changed by V_SCHP.

A signal transmitted from the CVT ECU 6 to the braking force control unit BCU will be described. F_SOLA is a flag for ON/OFF (close/open) the solenoid valve SV(A) of the braking force control unit BCU (shown in FIG. 6). The numeral 1 is given for closing (ON) the solenoid valve SV(A), and the numeral 0 is given for opening (OFF) the solenoid valve SV(A). F_SOLB is a flag for ON/OFF (close/open) the solenoid valve SV(B) of the braking force control unit BCU (shown in FIG. 6). The numeral 1 is given for closing (ON) the solenoid valve SV(B), and the numeral 0 is given for opening (OFF) the solenoid valve SV(B).

A signal transmitted from the positioning switch PSW to the CVT ECU 6 will be described. The positioning switch PSW selects N range, P range, R range, D range or L range, and the selected range is transmitted as positioning information.

A signal transmitted from the mode switch MSW to the CVT ECU 6 will be described. The mode switch MSW selects either D mode (normal running mode) or S mode (sports running mode), and the selected mode is transmitted as mode information. The mode switch MSW is a mode selection switch, which works when the positioning switch PSW is set in D range.

A signal transmitted from the brake switch BSW to the FI/MG ECU 4 and the CVT ECU 6 will be described. F_BKSW is a flag showing a condition whether the brake pedal BP is depressed (ON) or released (OFF). If the brake pedal BP is depressed, the numeral 1 is given, and if the brake pedal is released, the numeral 0 is given.

A signal transmitted from the CVT ECU 6 to the meter 10 will be described. The positioning switch PSW selects N range, P range, R range, D range or L range, and the selected range is transmitted as positioning information. Further, the mode switch MSW selects either D mode (normal running mode) or S mode (sports running mode), and the selected mode is transmitted as mode information.

Braking Force Control Unit
[Construction of Braking Force Control Unit]

The braking force control unit BCU comprises braking force retaining means RU which is capable of retaining braking force after releasing the brake pedal BP. The braking force retaining means RU continuously retains braking force after releasing the brake pedal BP, and it releases the braking force after releasing the brake pedal BP and in the process of increasing driving force of the vehicle to the strong condition.

As shown in FIG. 6, the braking force control unit BCU in this example is incorporated within brake fluid passages FP of a hydraulically operable braking device BK. The braking force control unit BCU comprises solenoid valves SV as braking force retaining means RU so as to switch between a communicating position where the brake fluid passage FP connecting the master cylinder MC and the wheel cylinders WC is communicated and a shut-off position where the brake fluid passage FP is shut off for retaining brake fluid pressure within the wheel cylinders WC.

With reference to FIG. 6, the braking force control unit BCU will be described. The brake fluid pressure circuit BC of the hydraulically operable braking device BK comprises the brake fluid passage FP connecting the braking device BK to the master cylinder MC and the wheel cylinders WC. Since brake is a very important factor for a safety run, the braking device BK has two separate systems of brake fluid pressure circuits BC(A), BC(B) Therefore, if one system is out of order, the remaining system works for obtaining a minimum braking force.

A master cylinder piston MCP is inserted into a main body of the master cylinder MC. When the driver applies a load to the brake pedal BP, the piston MCP is pressed and pressure is applied to brake fluid within the master cylinder MC so that mechanical force is converted into brake fluid pressure, i.e., the pressure applied to the brake fluid. When the driver releases the brake pedal BP for removing the applied load, the piston MCP is returned to the original position by the resilient action of a return spring MCS and brake fluid pressure is released. In view of fail-safe mechanism, there are provided two separate brake fluid pressure circuits BC. For this reason, the master cylinder MC shown in FIG. 6 is a tandem master cylinder, where two pistons MCP, MCP are connected in series so that the main body of the master cylinder MC is divided into two portions.

A master power MP (brake booster) is, provided between the brake pedal BP and the master cylinder MC so as to ease the braking effort of the driver. The master power MP shown in FIG. 6 is a vacuum servo type. The master power MP takes out negative pressure from an intake manifold of the engine 1 so as to facilitate the braking operation of the driver.

The brake fluid passage FP connects the master cylinder MC and the wheel cylinders WC. The brake fluid passage FP functions as a fluid channel for brake fluid. Brake fluid pressure generated at the master cylinder MC is transmitted to the wheel cylinders WC since a flow of the brake fluid travels through the brake fluid passage FP. When the brake fluid pressure within the wheel cylinders WC is greater, the brake fluid is transmitted from the wheel cylinders WC to the master cylinder MC through the brake fluid passage FP. Since separate brake fluid pressure circuits BC are provided for the reason mentioned above, there are also provided two separate brake fluid passage systems FP. The brake fluid pressure circuit BC such as constructed by the brake fluid passage shown in FIG. 6 is an X-piping type, where one brake fluid pressure circuit BC(A) is for braking a front right wheel and a rear left wheel, and the other brake fluid pressure circuit BC(B) is for braking a front left wheel and a rear right wheel. The brake fluid pressure circuit may be a front and rear dividing piping type, where one brake fluid pressure circuit is for braking front wheels, and the other brake fluid pressure circuit is for braking rear wheels.

The wheel cylinder WC is provided for each wheel 8 so that brake fluid pressure generated at the master cylinder MC and transmitted to the wheel cylinders WC through the brake fluid passage FP is converted into a mechanical force (braking force) for braking wheels 8. A piston is inserted into the wheel cylinder WC so that when the piston is pressed by brake fluid pressure, it generates braking force for actuating brake pads in the case of disc brakes or brake shoes in the case of drum brakes.

Additionally, there may be provided brake fluid pressure control valves for controlling brake fluid pressure within the wheel cylinders of the front and rear wheels.

With reference to FIG. 6, the braking force control unit BCU will be described. The braking force control unit BCU is incorporated within the brake fluid passage FP connecting the master cylinder MC and the wheel cylinders WC and comprises a solenoid valve SV as braking force retaining means RU. The braking force control unit BCU further comprises a restriction D, check valve CV and a relief valve RV, if necessary.

The solenoid valve SV is actuated by an electric signal from the control unit CU. The solenoid valve SV shuts off a flow of brake fluid within the brake fluid passage FP in its shut-off position so as to retain brake fluid pressure applied to the wheel cylinders WC. A flow of brake fluid with in the brake fluid passage FP is communicated when the solenoid valve SV is in a communicating position. The two solenoid valves SV(A), SV(B) shown in FIG. 6 are both in the communicating position. Provision of the solenoid valve SV prevents unintentional backward displacement of the vehicle upon starting on a slope. This is because when the driver releases the brake pedal BP, brake fluid pressure is retained within the wheel cylinder WC. The term "unintentional backward displacement" means that the vehicle moves in an opposite direction due to its own weight, in other words, the vehicle begins to descend backwards on a slope.

The solenoid valve SV may be of both normally open and normally closed types. However, in view of fail-safe mechanism, a normally open type is preferable. This is because when electricity is cut off due to malfunction, brake does not work or brake always works in a normally closed type solenoid valve SV. In the normal operation, the solenoid valve SV is shut off when the vehicle stops, and is kept in the shut-off position until the vehicle starts to move. Conditions for switching the solenoid valve SV to the shut-off position or to the communicating position will be described later.

A restriction D is provided in case of necessity. The restriction D always connects the master cylinder MC and the wheel cylinders WC regardless of the conditions of the solenoid valve SV such as in the communicating position or the shut-off position. Especially when the solenoid valve SV is in the shut-off position and the driver gradually or instantly releases the brake pedal BP, the restriction D reduces brake fluid pressure within the wheel cylinder WC at a certain speed by gradually transferring brake fluid from the wheel cylinder WC to the master cylinder MC. Such a restriction D may be formed by the provision of a flow control valve in the brake fluid passage FP. Alternatively, the restriction D may be formed at a part of the brake fluid passage FP by way of a flow resistance (reduced are a portion of the passage, at which a part of the section becomes narrow).

With the provision of the restriction D when the driver gradually or instantly releases the brake pedal BP, braking force is gradually lowered so that even if the solenoid valve SV is in the shut-off position, brake does not work permanently. In other words, reduction speed of the brake fluid pressure within the wheel cylinder is less than that of brake pedal load applied by the driver. Therefore, even if the solenoid valve SV is in the shut-off position, braking force is reduced after a certain period of time so that the vehicle can start to move on an up slope by the driving force of the driving motor. Meanwhile, the vehicle can start off on a down slope due to its own weight by merely releasing the brake pedal BP gradually or instantly without requiring the accelerator pedal operation of the driver.

The restriction D does not affect braking force as long as brake fluid pressure within the master cylinder MC due to the driver's brake pedal operation is greater than that within the wheel cylinder WC. This is because brake fluid flows based on a pressure difference between the wheel cylinder WC and the master cylinder MC, i.e. from one at higher brake fluid pressure to the other at lower brake fluid pressure. Unless the driver releases the brake pedal BP, brake fluid pressure within the wheel cylinder WC does not lower although it may increase. The restriction D may function as a check valve so as to prevent a counter flow from the master cylinder MC to the wheel cylinder WC.

Reduction speed of brake fluid pressure within the wheel cylinder WC is determined so as to prevent the vehicle from unintentional backward displacement during the time the driver releases the brake pedal BP and driving force is switched from the weak creep condition to the strong creep condition.

In the case that the reduction speed of brake fluid pressure within the wheel cylinder WC is faster, the vehicle will displace backwards on the slope before sufficient driving force will be obtained since braking force after releasing the brake pedal BP will be immediately lost even if the solenoid valve SV is closed. On the contrary, in the case that the reduction speed of brake fluid pressure within the wheel cylinder WC is slower, the vehicle will not displace backwards on the slope after releasing the brake pedal BP since brake is working at all times. However, extra time and driving force is required for obtaining sufficient driving force against the braking force. As described later, according to this embodiment, the solenoid valve SV is returned to the communicating position when driving force is exerted on the vehicle and depression of the brake pedal BP is released. Therefore, when the vehicle starts by driving force, reduction speed of brake fluid pressure within the wheel cylinder WC by way of the restriction D may be slower.

Reduction speed for reducing brake fluid pressure within the wheel cylinder WC is determined by properties of the brake fluid or shape of the restriction D (cross section or length of the flow passage). The restriction D maybe employed as an integral member with a solenoid valve SV and a check valve CV. In this case, the number of parts and install space may be reduced.

A check valve CV is provided in case of necessity. The check valve CV transfers brake fluid pressure generated within the master cylinder MC into the wheel cylinders WC on condition that the solenoid valve SV is closed and the driver increases brake pedal load. The check valve CV works effectively when brake fluid pressure generated within the master cylinder MC is greater than that within the wheel cylinder WC. The check valve CV quickly increases brake fluid pressure within the wheel cylinder WC in accordance with the increased brake pedal load.

If an arrangement is employed such that the solenoid valve SV is switched from the shut-off position to the communicating position when brake fluid pressure within the master cylinder MC becomes greater than that within the wheel cylinders WC, there is no need to provide a check valve CV since the solenoid valve SV itself responds to the increased brake pedal load.

A relief valve RV is also provided in case of necessity. The relief valve RV transfers brake fluid within the wheel cylinder WC into the master cylinder MC until brake fluid pressure within the wheel cylinder becomes a certain pressure level (relief pressure) on condition that the solenoid valve SV is in the shut-off position and the driver gradually or instantly releases the brake pedal BP. The relief valve RV works when brake fluid pressure within the wheel cylinder WC is greater than the predetermined brake fluid pressure and brake fluid pressure within the master cylinder MC. Therefore, even if the solenoid valve SV is in the shut-off position, extra brake fluid pressure within the wheel cylinder WC beyond the necessary brake fluid pressure is quickly reduced to the relief pressure. This will ensure a smooth starting operation of the vehicle even if the driver forcefully depresses the brake pedal BP more than required. Provision of the relief valve RV is advantageous when the vehicle starts on a down slope without assistance of driving force, for example a starting operation of the vehicle due to its own weight by releasing the brake pedal BP.

A brake switch BSW detects whether the brake pedal BP has been depressed or not. Based on the detected value, the control unit CU sends instructions as to whether the solenoid valve SV should be communicated or shut off.

A servo valve (linear solenoid valve), which can optionally adjust degrees of valve opening may be employed in place of the arrangement comprising a relief valve RV and a check valve CV in addition to a solenoid valve SV.

[Basic Control of Braking Force Control Unit]

Basic control of the braking force control unit BCU will be described.

I) Braking force control unit BCU switches the solenoid valves SV to the communicating position on condition that the brake pedal BP is depressed while the vehicle stops.

(1) Vehicle has to be stopped. This is because the driver can not park the vehicle at desired positions if the solenoid valves SV are switched to the shut-off position while the vehicle is moving at high speeds. However, switching the solenoid valves SV to the shut-off position does not affect the driver's operation if the vehicle stops. The condition "while the vehicle stops" includes a condition just before the vehicle stops.

(2) Brake pedal BP is depressed. This is because no braking force is retained if the brake pedal BP is not depressed. There is no significance on switching the solenoid valve SV to the shut-off position while the brake pedal is released.

The driver can stop the vehicle securely on a slope with the brake pedal BP forcefully depressed if a further condition is added other than the above conditions (1) and (2). The further condition requires that the driving force transmission capacity is in the smaller condition when the solenoid valves SV are switched to the shut-off position for retaining braking force. This leads to improved fuel consumption of the vehicle. The smaller condition includes a condition of zero driving force and a condition that the engine 1 stops.

And, II) Braking force retaining means RU releases braking force (i.e. the solenoid valves SV are returned to the communicating position) after releasing the brake pedal BP and in the process of increasing driving force to the strong condition.

(1) Brake pedal BP is released. This is because the driver has an intention to start the vehicle when depression of the brake pedal BP is released.

(2) Driving force is in the process of increasing to the strong condition (creep rising condition). This is because the driver may experience a sudden start of the vehicle if braking force is released when the driving force reaches to the strong condition (strong creep condition). This is more prominent on a down slope since the vehicles own weight additionally affects driving force of the vehicle per se.

However, a smooth starting operation of the vehicle without a sudden start on a down slope is achieved by the increasing driving force if braking force is released after releasing the brake pedal BP and in the process of increasing driving force to the strong condition. There may be a worry that the vehicle displaces backwards on an up slope if braking force is released in the process of increasing driving force to the strong condition. However, backward displacement of the vehicle on the slope is prevented by the inertial force and the rolling resistance (increasing driving force) of the vehicle.

Braking force retained restricts backward displacement of the vehicle until the braking force retention is released after releasing the brake pedal BP. Thereafter, the inertial force of the vehicle and the like restrict the backward displacement until driving force reaches to the strong condition (creep rising condition). As a result, since driving force increases to the strong condition while backward displacement of the vehicle is restricted, a smooth starting operation of the vehicle is achieved.

The process of increasing driving force to the strong condition includes any point of time after driving force occurs and before the driving force reaches to the strong condition. However, when few driving force is obtained, release of the braking force may cause backward displacement of the vehicle on an up slope, although it is advantageous on a down slope. Meanwhile, when greater driving force is obtained, release of the braking force may cause a sudden start of the vehicle on a down slope, although it is advantageous on an up slope. Timing at which release of the braking force is carried out should be determined in consideration of the inertial force and the rolling resistance of the vehicle as well as in comparison with advantages and disadvantages of the slope. This will be described later with reference to [Requirement for creep rising condition].

Specific Control of Vehicle

With reference to FIGS. 7 to 13, control of the vehicle will be described in greater detail.

Conditions for Retaining Braking Force

Figure 7A:
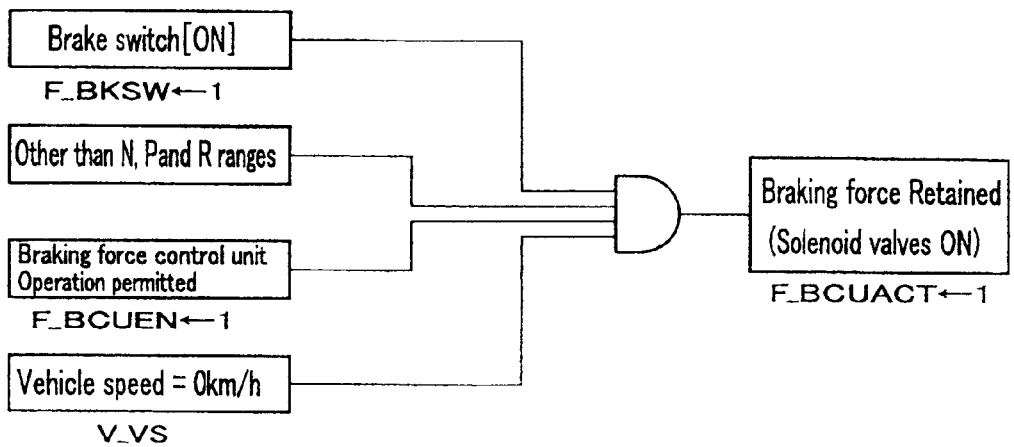
FIG. 7A shows the logic fore retaining braking force.

Conditions for retaining braking force by the braking force control unit BCU will be described below. As shown in FIG. 7A, braking force is retained when all of the following four conditions are satisfied.

I) Brake switch BSW is ON.

II) Running range is other than Neutral (N range), parking (P range) and Reverse (R range).

III) Operation of the braking force control unit BCU is permitted.

IV) Vehicle speed is 0 km/h.

When all the above conditions are satisfied, both solenoid valves SV(A), SV(B) are switched to the shut-off position, thereby retaining braking force.

The above four conditions will be described below.

I) Brake switch BSW has to be ON, otherwise no braking force or few braking force will be retained within the wheel cylinders WC.

II) Running range is other than Neutral (N range), parking (P range) and Reverse (R range). This is for canceling unnecessary operation of the braking force control unit BCU in N range or P range, and in R range, for preventing the vehicle from unintentional backward displacement with the aid of the driving force in the strong creep condition since the strong creep condition is kept in the Reverse range. Therefore, braking force is retained while D range (driving range) or L range (low range) is selected.

III) Operation of the braking force control unit BCU is permitted. This is for reminding the driver of sufficiently depressing the brake pedal BP before retaining braking force, thereby preventing unintentional backward displacement of the vehicle. Since sufficient driving force is obtained in the strong creep condition such that the vehicle can stand still on a slope at an inclination angle of 5 degrees, the driver often depresses the brake pedal BP insufficiently. In this circumstance, if the solenoid valves SV are closed and the engine 1 is stopped, the vehicle will unintentionally displace backwards. Meanwhile, in the weak creep condition and the middle creep condition, driving force is not sufficient for stationarily retaining the vehicle on a slope having an inclination angle of 5 degrees. When driving force is decreased on a slope, the driver forcefully depresses the brake pedal BP. This ensures sufficient braking force preventing the vehicle from backward displacement on the slope even if driving force is decreased or lost. The control logic for permitting an operation of the braking force control unit BCU will be described later.

IV) Vehicle speed is 0 km/h. This is because the driver can not select a position for parking the vehicle if the solenoid valves SV are switched to the shut-off position during the vehicle is running.

Meanwhile, since the vehicle stops while the vehicle speed is 0 km/h, braking force can be retained without any troubles in the driving operation. "Vehicle speed of 0 km/h" also includes a condition just before the vehicle stops.

[Conditions Required for Permitting Operations of the Braking Force Control Unit]

Figure 7B:
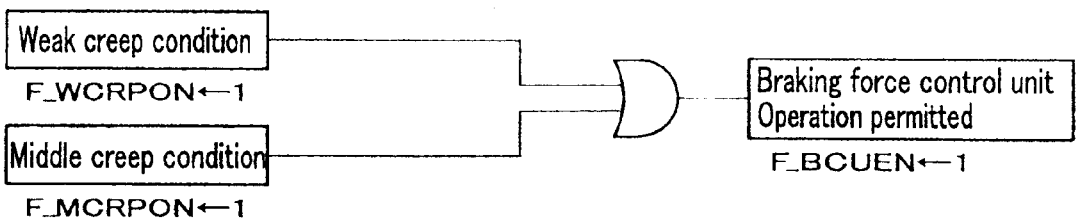
FIG. 7B shows the logic for permitting operations of the braking force control unit.

With reference to FIG. 7B, conditions required for permitting an operation of the braking force control unit BCU will be described. An operation of the braking force control unit BCU is permitted while driving force is either in the weak creep condition or in the middle creep condition. In the weak creep condition and the middle creep condition, driving force is not sufficient for stationarily retaining the vehicle on a slope having an inclination angle of 5 degrees. For this reason, the driver is forced to depress the brake pedal BP sufficiently before retaining braking force so as to obtain sufficient driving force for preventing backward displacement of the vehicle. Driving force in the weak creep condition or in the middle creep condition is judged based on a hydraulic pressure command value to a linear solenoid valve of the CVT 3, where the engagement hydraulic pressure of the starting clutch is controlled.

[Conditions Required for Weak Creep Order]Conditions for transmitting a weak creep order will be described. As shown in FIG. BA, the weak creep order ($F_{13}$ WCRP) is transmitted when any of the following conditions I) and II) is satisfied. The conditions are:

I) Transmission is in N range or P range (N range/P range).

II) The following two conditions are both satisfied.

[(1) Braking force control unit BCU is normal; (2) Brake switch BSW is ON; (3) Advance range (D range/L range) is selected; and (4) Vehicle speed is at 5 km/h or lower] and further [(5) Vehicle speed is in the vicinity of a certain vehicle speed; (6) Driving force is in the weak creep condition; or (7) Vehicle speed is 0 km/h, Driving force is in the middle creep condition, and A certain time has passed after switching to the middle creep condition].

When one of the above conditions I) and II) is satisfied, the weak creep order is transmitted and driving force is switched to the weak creep condition.

The above conditions are judged at the driving force control unit DCU. The reason for switching driving force to the weak creep condition is that vibrations of the vehicle is prevented and fuel consumption of the vehicle can be improved. In the case of an up slope, it is for reminding the driver of forcefully depressing the brake pedal BP so as to prevent backward displacement of the vehicle while the vehicle stops on the slope. In the case of a flat surface or a down slope, it is for reducing the driving force so that the vehicle can be stopped with smaller braking force.

The conditions for transmitting the weak creep order will be described.

I) Transmission is in N range or P range. This is because if the transmission is selected from a non-driving range (N/P range) to a driving range (D/L/R range) and at the same time the accelerator pedal is quickly depressed, the driving force transmission capacity of the starting clutch can be instantly increased, allowing a smooth starting operation of the vehicle. In the weak creep condition, since pressure oil has been filled in an oil pressure chamber of the starting clutch, there is, no clearance or play for the advance stroke of the piston enforcing the clutch. Therefore, the driving force transmission capacity is instantly increased by increasing the pressure value of the pressure oil.

Driving force is switched to the weak creep condition when the transmission is selected to N or P range. This is for previously changing the driving force transmission capacity of the starting clutch to the capacity at the weak creep condition. However, driving force from the engine 1 is not transmitted to the driving wheels 8, 8. This is distinguished from the weak creep condition while the transmission is selected to D/L range. In N/P range, connection between the engine 1 and the driving wheels 8, 8 is completely cut by a forward/reverse movement switching mechanism arranged in series with the starting clutch on a driving force transmission path. Since neither a transmission path for the forward movement nor a transmission path for the reverse movement is provided in N/P range, driving force from the engine 1 is not transmitted to the driving wheels 8, 8.

II) Conditions (1) to (4) are basic requirements for switching to the weak creep condition. Meanwhile, conditions (5) to (7) indicate conditions of the vehicle before switching to the weak creep condition.

(1) Braking force control unit BCU is normal. Braking force is not retained if the braking force control unit BCU is out of order. Since sufficient driving force is not obtained in the weak creep condition, the vehicle will displace backwards on a slope. If the weak creep order is transmitted and driving force is switched to the weak creep condition regardless of abnormal conditions of the vehicle, eg the solenoid valve SV is not switched to the shut-off position, brake fluid pressure is not retained within the wheel cylinders WC (braking force is not retained) when releasing the brake pedal BP. Therefore, if the driver releases the brake pedal BP upon starting on the slope, braking force is suddenly lost and the vehicle displaces backwards. A smooth starting operation without unintentional backward displacement of the vehicle is therefore achieved by the strong creep condition.

(2) Brake switch BSW is ON. This is because the driver does not intend reduction of the driving force.

(3) Advance range (D/L range) is selected. This is for improving fuel consumption of the vehicle while an advance range is selected. When the positioning switch PSW selects D range, driving force is switched to the weak creep condition notwithstanding the position (D mode/S mode) of the mode switch MSW. However, in the R range, driving force is not switched to the weak creep condition. This is for facilitating a steering operation of the vehicle at a garage with the vehicle kept in the strong creep condition.

(4) The vehicle speed is at 5 km/h or lower. This is because driving force of the driving wheels 8, 8 is transmitted to the engine 1 or the motor 2 through the starting clutch of the CVT 3 so as to obtain engine brake or carry out regenerative power generation by the motor 2.

(5) Vehicle speed is in the vicinity of a certain vehicle speed. The driver will receive unintentional strong deceleration if the driving force is decreased from the strong creep condition to the weak creep condition by the depression of the brake pedal BP while the difference of the driving force values (difference of the driving force) between the strong creep condition and the weak creep condition is greater. This is because braking force resulting from the reduction of the driving force further affects on the vehicle.

In this case, switching of the driving force to the smaller condition is permitted only when the driving force is in the vicinity of the certain vehicle speed, at which the difference of the driving force is smaller between the strong creep condition and the weak creep condition. In this embodiment, the vicinity of the certain vehicle speed indicates the vehicle speed of 4 km/h and 5 km/h (accuracy of the vehicle speed meter; 1 km/h). In other words, only when the brake pedal BP is depressed at a vehicle speed of 4 km/h or 5 km/h while the vehicle is in the strong creep condition and moves under idling running, the driving force is decreased to the weak creep condition. With this condition, the driving force is switched to the weak creep condition in the vicinity of the certain vehicle speed not only by a case that the brake pedal is depressed in idling running with the driving force kept in the strong creep condition and during the vehicle speed rises, but also a case that the brake pedal is depressed while the vehicle speed falls from the vehicle speed over 5 km/h. In the latter case, at least the following two situations are included: i.e., (1) the vehicle speed falls because of an up slope, and (2) the vehicle speed falls by continued brake application from a higher vehicle speed over the certain vehicle speed.

As long as the vehicle speed is not in the vicinity of the certain vehicle speed, the strong creep condition is kept even if the brake pedal BP is depressed. This is because when the vehicle speed is not in the vicinity of the certain vehicle speed, the difference of the driving force between the strong creep condition and the weak creep condition is greater. In this case, the driver will receive unintentional strong deceleration more than the amount of the brake pedal depression. Another reason is that steering operations at a garage can be eased while the driving force is kept in the strong creep condition.

(6) Driving force is in the weak creep condition. This is because once switched to the weak creep condition, the weak creep condition is retained regardless of the conditions (5) and (7). According to the condition (5), driving force is switched to the weak creep condition if the brake pedal BP is depressed while the vehicle is running in the vicinity of the certain vehicle speed, i.e., the vehicle speed of 4 km/h or 5 km/h. Therefore, the condition (5) is not satisfied if the vehicle speed is less than 4 km/h. The weak creep condition is not retained merely by the condition (5) if the vehicle speed is under 4 km/h. As a result, "Driving force is in the weak creep condition" is required so as to retain the weak creep condition under the vehicle speed of 4 km/h.

(7) Vehicle speed is 0 km/h, driving force is in the middle creep condition, and a certain time has passed after switching to the middle creep condition. This is because deteriorated fuel consumption and vibrations of the vehicle body, while the vehicle stops in the strong creep condition, are prevented with driving force switched to the weak creep condition. When driving force is not changed to the weak creep condition in the vicinity of the certain vehicle speed (for example, the brake pedal BP is depressed at the vehicle speed of 3 km/h), the strong creep condition is kept even if the brake pedal BP is depressed. In this situation, if the vehicle stops for a while, fuel consumption of the vehicle deteriorates and vibrations of the vehicle remains. For this reason, when the vehicle completely stops (vehicle speed=0 km/h), driving force is switched to the middle creep condition, in which driving force is between the strong creep condition and the weak creep condition, and thereafter, if a certain time has passed (300 msec in this example), driving force is further switched to the weak creep condition. Since braking force due to depression of the brake pedal BP increases (by the driver's further increasing operation of the brake pedal BP) while driving force is stepwise reduced from the strong creep condition to the middle creep condition and further to the weak creep condition, the momentary displacement amount of the vehicle on an up slope is restricted as small as possible.

[Conditions Required for Strong Creep Condition for Driving]

Figure 8A:
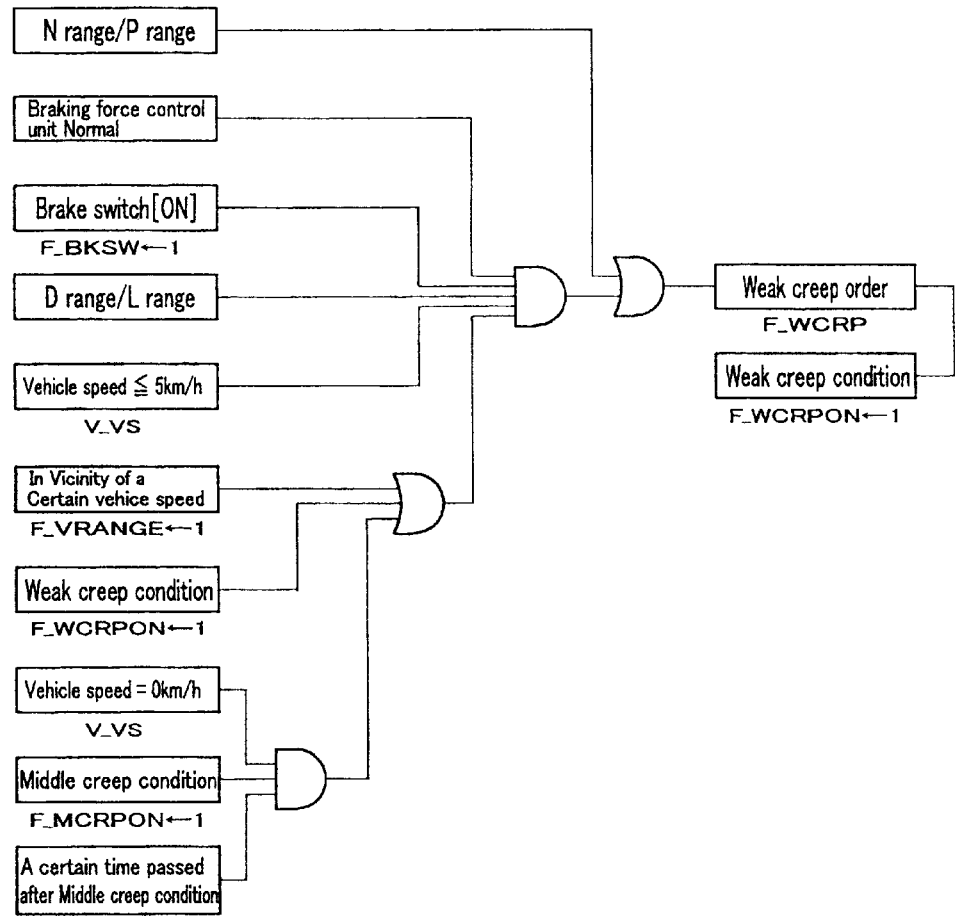
FIG. 8A shows the control logic for switching to a weak creep condition.
Figure 8B:
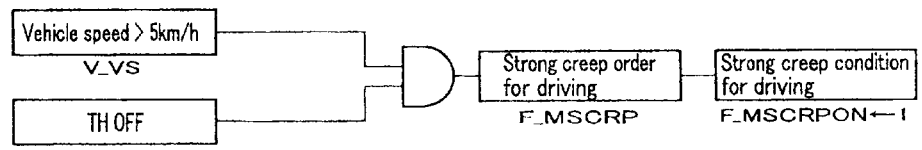
FIG. 8B shows the control logic for switching to a strong creep condition for driving.

Conditions required for strong creep condition for driving will be described. A strong creep order for driving (F_MSCRP) is transmitted when both of the following two conditions I) and II) are satisfied (FIG. 8B). Creep driving force is switched to the strong creep condition for driving after the strong creep order for driving is transmitted.

I) Vehicle speed>5 km/h.

II) Throttle is OFF (depression of the accelerator pedal is released).

These conditions are judged at the driving force control unit DCU. Driving force is switched to the strong creep condition for driving in order to prevent unintentional strong deceleration of the vehicle, even if the vehicle decelerates from the vehicle speed of 5 km/h or more to the certain vehicle speed or lower by the depression of the brake pedal BP and the driving force is switched to the weak creep condition. Therefore, the driving force is kept lower than that in the strong creep condition. Another reason for switching to the strong creep condition for driving is that the switching to the strong creep condition is smoothly operated when the vehicle speed lowers without depression of the brake pedal BP under idling running.

Each of the above conditions will be described.

I) Vehicle speed>5 km/h. This is for discriminating between the strong creep condition at the vehicle speed of 5 km/h or lower and the strong creep condition for driving over the vehicle speed of 5 km/h.

II) Throttle is OFF (TH OFF). Since the driver does not intend further increment of driving force, driving force may be decreased without any problems.

[Conditions Required for Middle Creep Condition]

Figure 8C:
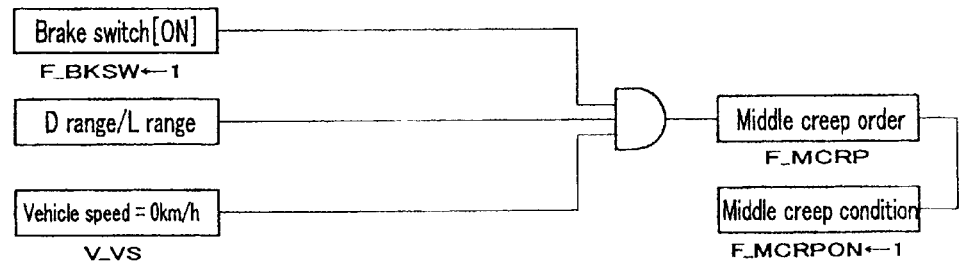
FIG. 8C shows the control logic for switching to a middle creep condition, respectively.

Conditions required for the middle creep condition will be described. As shown in FIG. 8C, when the following three conditions I), II) and III) are satisfied, a middle creep order (F_MCRP) is transmitted.

I) Brake switch BSW is ON.

II) Advance range (D/L range)is selected.

III) Vehicle is stopped (vehicle speed=0 km/h).

These conditions are judged at the driving force control unit DCU. The reason for switching driving force to the middle creep condition is as follows.

The strong creep condition is retained if driving force is not changed to the weak creep condition in the vicinity of the certain vehicle speed (vehicle speed of 4 km/h and 5 km/h) or if the vehicle speed of 3 km/h or lower is retained after switching to the strong creep condition by way of releasing the brake pedal BP while being in the weak creep condition. However, if the vehicle remains stopping in the strong creep condition, fuel consumption deteriorates and vibrations of the vehicle remains. The vehicle in this example takes the maximum driving force value in the strong creep condition at the vehicle speed of 0 km/h. However, in an up slope, momentary backward displacement of the vehicle occurs if driving force is switched from the strong creep condition to the weak creep condition while the vehicle stops. This is because the driving force restricting backward displacement of the vehicle is decreased. In order to prevent such momentary backward displacement of the vehicle, the driving force is switched to the middle creep condition, which is between the strong creep condition and the weak creep condition. When do so, the driver forcefully depresses the brake pedal BP.

The above conditions required for the middle creep order will be described.

I) Brake switch BSW is ON. This is because the driver does not intend to reduce driving force when the brake pedal BP is not depressed.

II) Advance range (D/L range) is selected. It is necessary for switching to the middle creep condition while an advance range is selected since driving force is switched to the weak creep condition while the positioning switch is selected to D range or L range. Switching to the middle creep condition is not necessary in N/P range since the weak creep condition is selected as soon as the transmission is switched. Also, switching to the middle creep condition is not necessary in R range since the strong creep condition is retained in R range.

III) Vehicle is stopped (vehicle speed=0 km/h). Driving force is switched to the weak creep condition in order to prevent deteriorated fuel consumption and vibrations of the vehicle while the vehicle stops in the strong creep condition. The middle creep condition is required as a transitional condition to the weak creep condition.

Judgement whether or not driving force is in the weak creep condition, strong creep condition for driving or the middle creep condition is made based on the hydraulic pressure command value to the starting clutch of the CVT 3.

[Conditions for Automatically Stopping the Engine]

Figure 9:
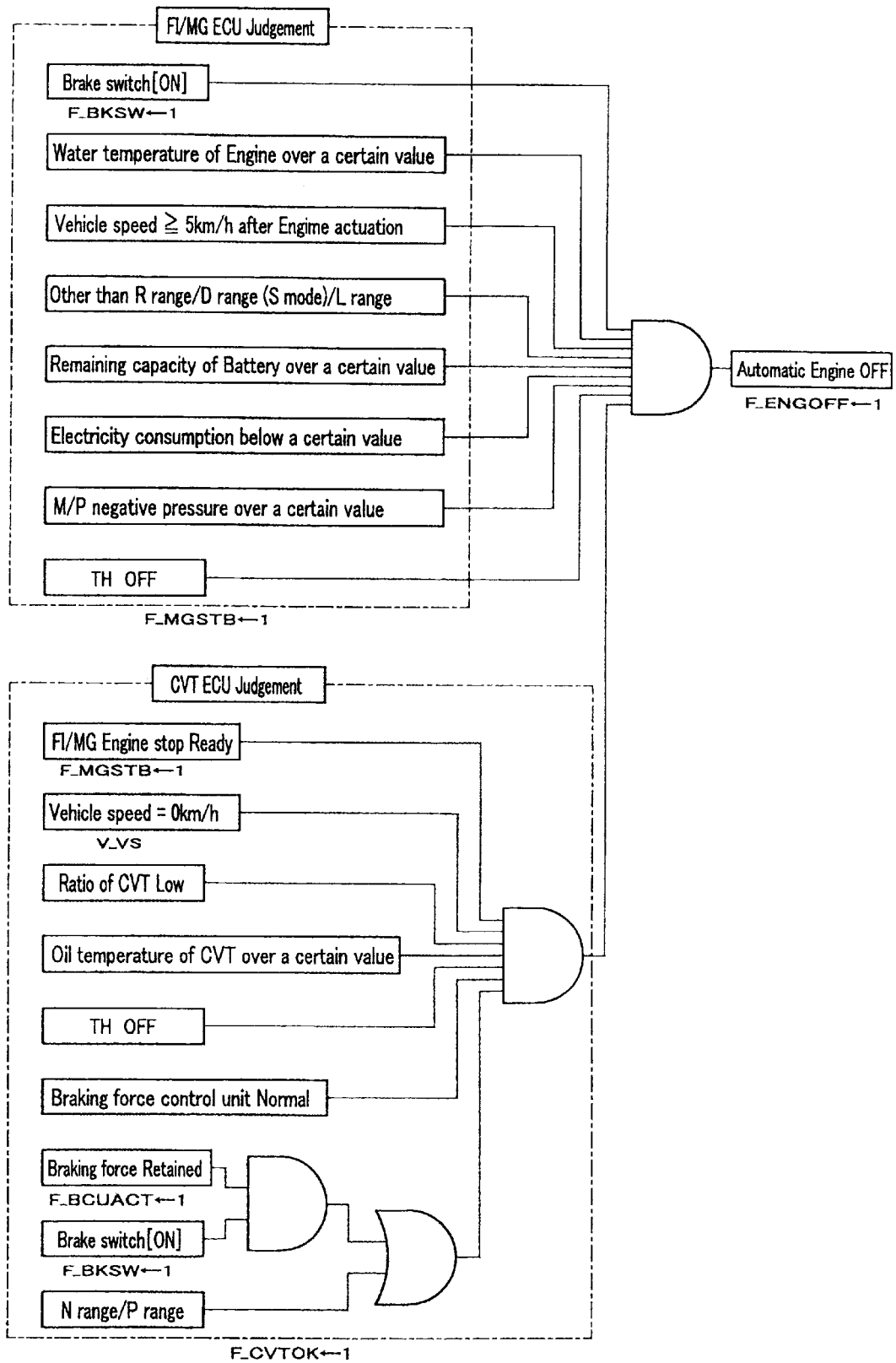
FIG. 9 is the control logic for automatically stopping an engine of a driving motor stopping unit according to one example of the invention.

For the purpose of further improvement of fuel consumption, the engine 1 is automatically stopped while the vehicle stops. Conditions for automatically stopping the engine 1 will be described. When all the conditions shown in FIG. 9 are satisfied, an engine stop order (F_ENGOFF) is transmitted and the engine 1 is automatically stopped. The automatic engine stop operation of the engine 1 is carried out by the driving motor stopping unit. Therefore, the following automatic engine stop conditions are judged at the driving motor stopping unit. Specifically, the automatic engine stop conditions are judged at the FI/MG ECU 4 and the CVT ECU 6. When the FI/MG ECU 4 judges that all the following conditions I) to VIII) are satisfied, F_MGSTB becomes 1. When the CVT ECU 6 judges that all the following conditions IX) to XV) are satisfied, F_CVTOK becomes 1.

Each of the automatic engine stop conditions will be described.

I) Brake switch BSW is ON. This is for warning the driver. The driver places his foot on the brake pedal BP when the brake switch BSW is ON. Therefore, if the engine 1 is stopped and driving force is lost, the driver can easily increase a brake pedal load before the vehicle unintentionally displaces backwards on a slope.

II) Water temperature of the engine is over a certain value. This is because the actuation/stop operation of the engine 1 should be carried out when the engine 1 is in stable conditions. In a cold area, if the water temperature is low, the engine 1 may not restart.

III) Vehicle speed once reaches to 5 km/h after engine actuation. This is for facilitating a steering operation at a garage while the vehicle moves in the creep running. The steering operation at a garage will be time-consuming if the engine 1 is stopped whenever the vehicle stops for changing steering directions.

IV) Positioning switch PSW and Mode switch MSW select other than R range/D range (S mode)/L range, i.e., N range/D range (D mode)/P range is selected. This is for the following reasons. A steering operation at a garage while selecting R rage or L range will be time-consuming if the engine 1 is stopped whenever the vehicle stops for changing steering directions. When the positioning switch PSW selects D range and the mode switch MSW selects S mode, the driver is expecting a quick start operation of the vehicle.

V) Capacity of the battery is over a certain value. If the remaining capacity of the battery is not enough to restart the engine 1, the motor cannot actuate the engine 1 after stopping the engine.

VI) Electricity consumption is below a certain value. This is for securing sufficient electrical supply to loads.

VII) Load of the constant pressure chamber of the master power MP is over a certain value. This is because the smaller negative pressure in the constant pressure chamber of the master power MP, the smaller amplification of the brake load when depressing the brake pedal BP, leading to deteriorated braking performance. Since negative pressure in the constant pressure chamber is obtained from the intake pipe of the engine 1, negative pressure in the constant pressure chamber becomes far smaller if the engine 1 is stopped at smaller negative pressures. This leads to reduced amplification of the brake load when the driver depresses the brake pedal BP, and hence resulting in deteriorated braking performance.

VIII) Accelerator pedal is not depressed (TH OFF). Since the driver does not intend further increment of the driving force, the engine 1 may be automatically stopped.

IX) All the automatic engine stop conditions at FI/MG ECU 4 are satisfied. If all the engine stop conditions judged at the FI/MG ECU 4 are not satisfied, it is not preferable to carry out the automatic engine stop operation.

X) Vehicle speed is 0 km/h. Driving force is not required when the vehicle stops.

XI) Ratio of the CVT is low. This is because a smooth starting operation of the vehicle is not carried out unless the ratio of the CVT (pulley ratio) is low.

XII) Oil temperature of the CVT is over a certain value. If the oil temperature of the CVT 3 is low, start-up for hydraulic pressure of the starting clutch will cause a delay. Therefore, the required time from the engine actuation to the strong creep condition is extended, and the vehicle will displace backwards on a slope.

XIII) Accelerator pedal is not depressed (TH OFF). Since the driver does not intend further increment of driving force, the engine 1 may be automatically stopped.

XIV) Braking force control unit BCU is normal. Since braking force may not be retained if the braking force control unit BCU is out of order, the strong creep condition is kept for preventing the vehicle from unintentional backward displacement.

XV) [(1) Braking force is retained (solenoid valve SV in shut-off position) and Brake switch BSW is ON] or [(2) Positioning switch PSW selects N range/P range]. This is for the following reasons:

(1) As long as braking force is retained, the vehicle does not displace backwards on a slope even if the engine 1 is automatically stopped and driving force is lost. Further, when the brake switch BSW is ON, the driver places his foot on the brake pedal BP. Therefore, if the engine 1 is stopped and the driving force is lost, the driver can easily increase a brake pedal load before the vehicle unintentionally displaces backwards on a slope.

(2) If the vehicle stops with the positioning switch PSW selecting P range or N range, the driver intends to pull up the vehicle. Therefore, the engine 1 may be automatically stopped. In this condition, the engine 1 is automatically stopped even if the braking force control unit BCU is not actuated.

Conditions for Releasing Braking Force

Figure 10A:
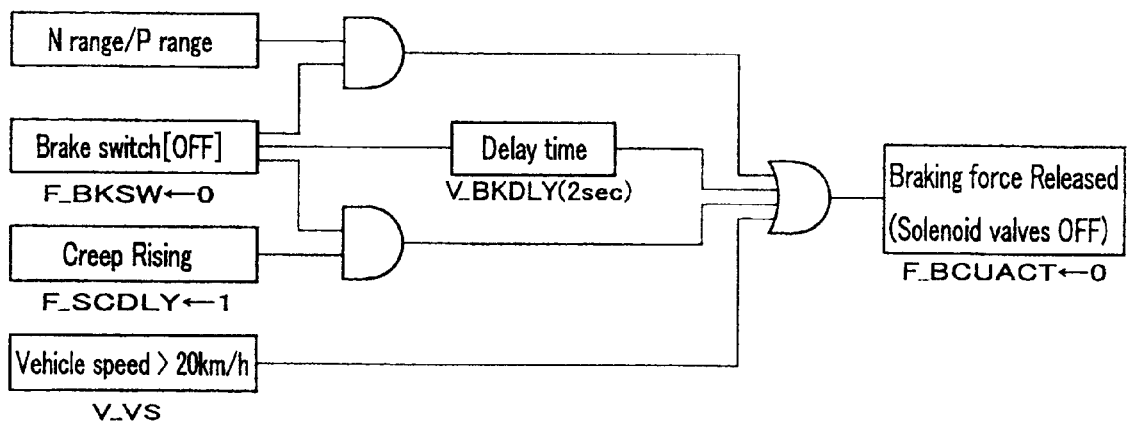
FIG. 10A shows the control logic for releasing retained braking force.

Conditions that the braking force control unit BCU releases braking force will be described. As shown in FIG. 10A, braking force is released when any of the following conditions is satisfied:

I) Positioning switch PSW selects N range/P range and Brake switch BSW is OFF.

II) A certain delay time has passed after Brake switch BSW becomes OFF.

III) Creep force has risen and Brake switch BSW is OFF.

IV) Vehicle speed is over 20 km/h.

When any of the above conditions is satisfied, the solenoid valves SV are switched to the communicating position for releasing braking force to be retained.

Each of the above conditions will be described.

I) Positioning switch PSW selects N range/P range and Brake switch BSW is OFF. This is for eliminating unnecessary operation of the braking force control unit BCU.

II) A certain delay time has passed after Brake switch BSW becomes OFF. It is not preferable as a fail-safe action that braking force is permanently retained after releasing the brake pedal BP and brake dragging occurs. In this example, the delay time is about 2 seconds after releasing the brake pedal BP, i.e. after the brake switch BSW is OFF.

III) Creep force has risen and Brake switch BSW is OFF. In this condition, driving force is in the process of increasing to the strong creep condition. However, taking into consideration the inertial force and the rolling resistance (increasing driving force) of the vehicle, unintentional backward displacement of the vehicle on an up slope is restricted. The driver can also start off the vehicle on a down slope without sudden impact.

IV) Vehicle speed is over 20 km/h. This is for eliminating unnecessary brake dragging as a fail-safe action.

[Requirement for Creep Rising Condition]

Figure 10B:
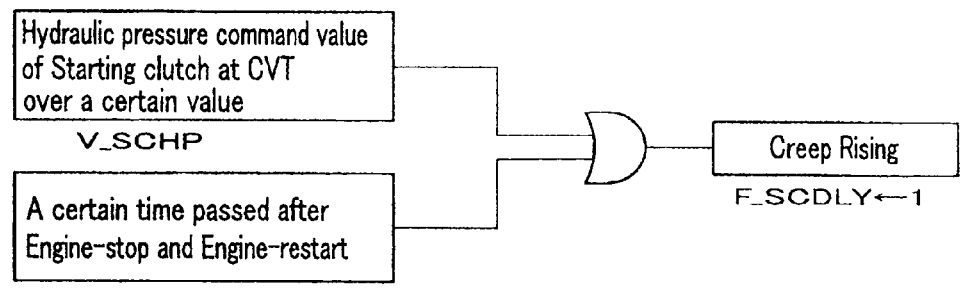
FIG. 10B shows the control logic for judging a creep rising condition, respectively.

Requirement for a creep rising condition will be described. As shown in FIG. 10B, when any of the following conditions I) and II) is satisfied, it is considered that the creep diving force has risen.

I) Hydraulic pressure command value of the starting clutch at the CVT 3 is over a certain value.

II) A certain time has passed after the engine 1 is automatically stopped and then restarted.

These two conditions are judged at the driving force control unit DCU. In the creep rising condition, driving force has been increased to such an extent that backward displacement of the vehicle on the slope is prevented, taking into consideration the inertial force and the rolling resistance (increasing driving force) of the vehicle. Therefore, even if the actuation of the braking force control unit BCU is released and the braking force is lost, backward displacement of the vehicle is prevented. The creep rising condition also includes a condition allowing slight backward displacement of the vehicle, as long as the increasing driving force minimize the backward displacement of the vehicle.

The above conditions required for the creep rising condition will be described.

I) When the hydraulic pressure command value of the starting clutch at the CVT 3 is over a certain value, driving force has been increased to such an extent that backward displacement of the vehicle is prevented for the reason mentioned above. Therefore, backward displacement of the vehicle is prevented even if braking force is released. The driver can also start off the vehicle on a down slope without sudden impact. "The hydraulic pressure command value over a certain value" indicates that the hydraulic pressure command value—it is transmitted to the linear solenoid valve, which controls hydraulic pressure for the engaging force of the starting clutch—has been increasing substantially to a half value between the weak creep condition and the strong creep condition, in the process switching from the weak creep condition to the strong creep condition.

II) A certain time has passed after the engine 1 is automatically stopped and then restarted. This is because driving force has been increased to such an extent that backward displacement of the vehicle is prevented for the reason mentioned above, even after releasing braking force to be retained. This is also for ensuring a smooth starting operation of the vehicle on a down slope without sudden impact. Time-counting is initiated when the engine 1 is automatically restarted and supply of pressure oil to the starting clutch is started. Hydraulic oil has been discharged from the oil pressure chamber of the starting clutch at the CVT 3 while the engine 1 is stopped. Therefore, a clearance or play exists for the advance stroke of the piston enforcing the clutch when the engine 1 is actuated and supply of the pressure oil is initiated. For this reason, the hydraulic pressure command value to the linear solenoid valve of the starting clutch does not correspond to the actual hydraulic pressure value (driving force transmission capacity). When increasing driving force from the engine stop condition, it is impossible to judge the creep rising condition based on the hydraulic pressure command value of the starting clutch. As a result, the creep rising condition is judged when a timer counts a certain period time after the supply of the pressure oil to the starting clutch is initiated.

[Conditions Required for Strong Creep Order]

Figure 11A:
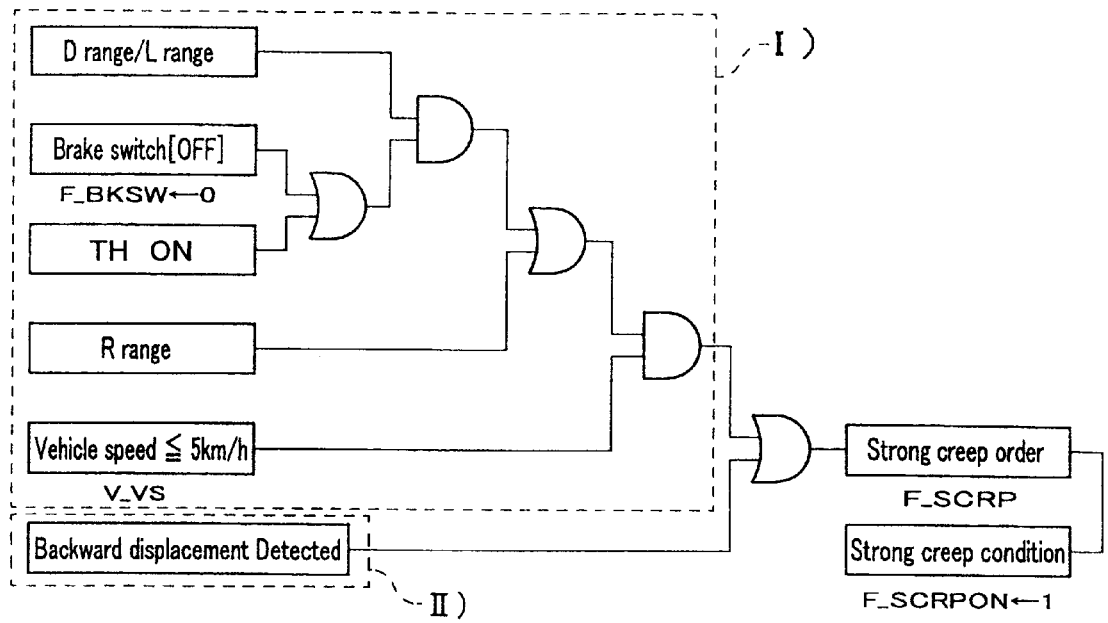
FIGS. 11A and 11B show the control logic for switching to the strong creep condition. Here.
Figure 11B:
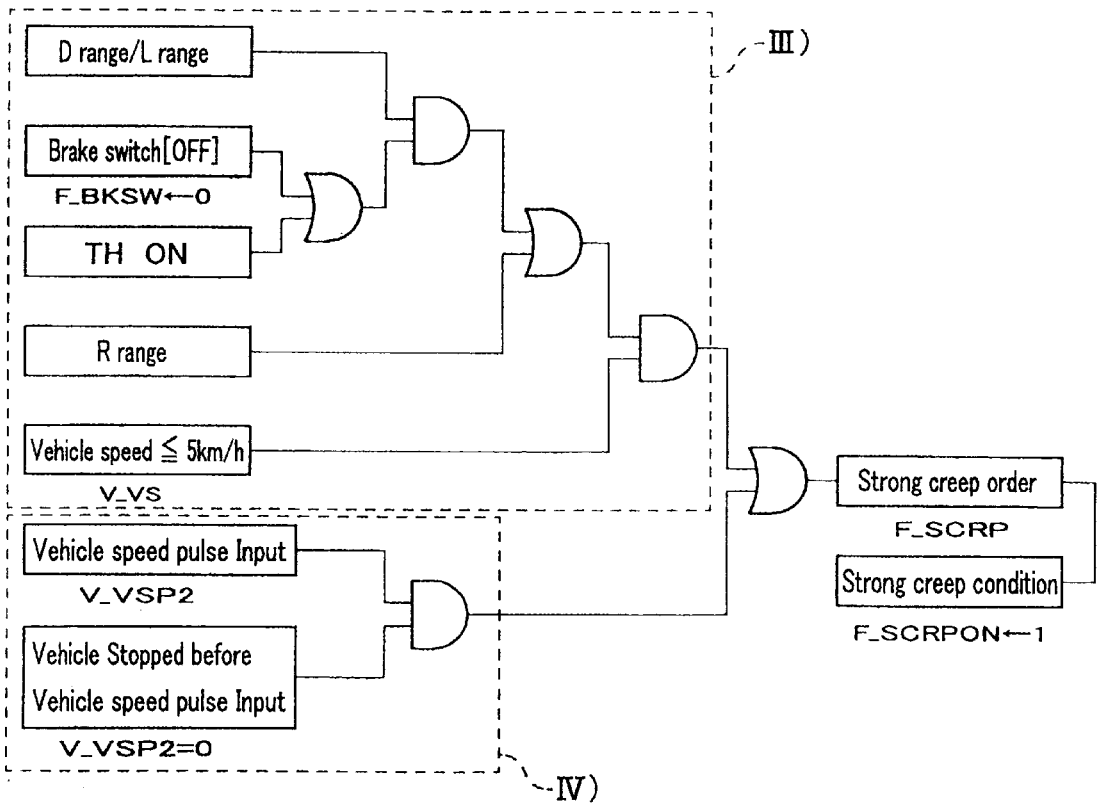

Conditions for a strong creep order will be described. The strong creep order (F_SCRP) is transmitted when any of the following two conditions shown in FIGS. 11A and 11B is satisfied. The first condition required for the strong creep order is that either I) or II) is satisfied (FIG. 11A).

I) [(1) Brake switch is OFF or Throttle is ON, and Advance range (D/L range) is selected] or [(2) Positioning switch PSW selects the reverse (R) range] and (3) Vehicle speed is at 5 km/h or lower.

II) Backward displacement of the vehicle is detected.

Meanwhile, the second condition required for the strong creep order is that either III) or IV) is satisfied (FIG. 11B).

III) [(1) Brake switch is OFF or Throttle is ON, and Advance range (D/L range) is selected] or [(2) Positioning switch PSW selects the reverse (R) range] and (3) Vehicle speed is at 5 km/h or lower.

IV) Vehicle speed pulse is input and Vehicle is fully stopped before the input of vehicle speed pulse.

In the first and the second conditions required for the strong creep order, I) and III) are identical, while II) and IV) are different. Therefore, explanation of the condition III) is omitted. These conditions I) to IV) are judged at the driving force control unit DCU.

Each of the above conditions will be described below.

At first, (1) to (3) of the condition I) will be described. However, since they are identical to those of the condition III), explanation is omitted with regard to (1) to (3) of the condition III).

(1) Brake switch is OFF or Throttle is ON, and Advance range (D/L range) is selected. Since the driver initiates a starting operation, driving force is changed to the strong creep condition. The driver has an intention to start the vehicle since the positioning switch PSW is selected to D range or L range and further depression of the brake pedal BP is released or instead the accelerator pedal is depressed. Therefore, driving force is switched from the weak creep condition to the strong creep condition.

With the depression of the accelerator pedal, the driving force transmission capacity increases, even after reaching to the greater driving force transmission capacity, to a capacity allowing to transmit all the driving force generated at the driving motor (condition greater than the greater driving force transmission capacity). However, the flag showing the strong creep condition (F_SCRPON) is kept until another flag rises.

(2) Positioning switch PSW selects the reverse (R)range. This is for ensuring a smooth creep driving in R range. When the positioning switch PSW is selected to R range, the driver expects a steering operation at a garage with driving force switched to the strong creep condition. Therefore, driving force is switched from the weak creep condition to the strong creep condition.

(3) Vehicle speed is at 5 km/h or lower. This is because the strong creep condition for driving at a vehicle speed over 5 km/h can be distinguished from the strong creep condition at a vehicle speed 5 km/h or lower.

II) Backward displacement of the vehicle is detected. When the vehicle starts to displace backwards on a steep slope with the backward displacement force derived from the vehicle's own weight being greater than braking force, driving force in the strong creep condition prevents the backward displacement of the vehicle. When the vehicle stops on an up slope, the total amount of driving force in the weak creep condition (driving force is zero if the engine 1 is automatically stopped) and braking force resists the backward displacement force of the vehicle. However, since the greater inclination angle of the slope, the greater backward displacement force, the vehicle starts to displace backwards on the steep slope with the backward displacement force being greater than the total amount of the driving force in the weak creep condition and the braking force. For this reason, when backward displacement of the vehicle is detected, driving force is switched from the weak creep condition to the strong creep condition in any circumstances so as to generate sufficient driving force against the slope.

Figure 13A:
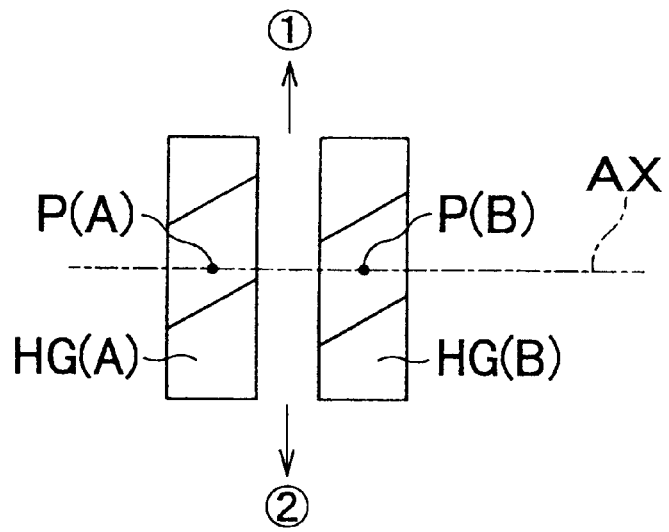
FIG. 13A shows a construction thereof.
Figure 13B:
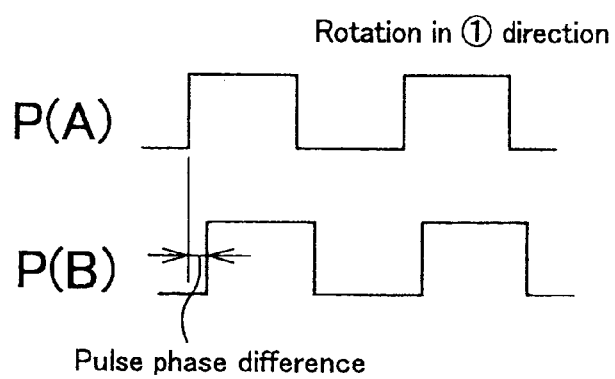
FIG. 13B shows a pulse phase for ① direction of FIG. 13A.
Figure 13C:
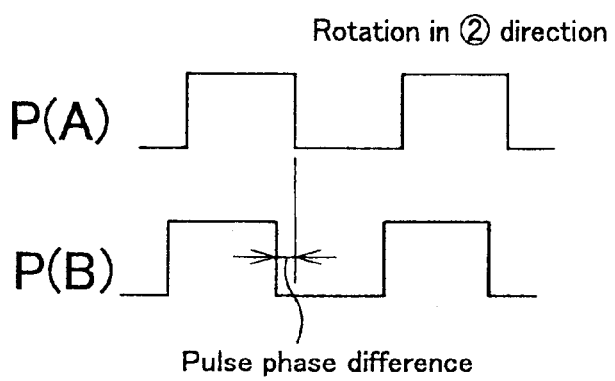
FIG. 13C shows a pulse phase for ② direction of FIG. 13A, respectively.

With reference to FIG. 13, means for detecting backward displacement of the vehicle will be described. For example, helical gears HG(A), HG(B) are provided at a downstream of the starting clutch of the CVT 3. The helical gears HG(A), HG(B) may be provided at any positions as long as they are rotatable with the tires. As shown in FIG. 13A, gear tooth of the helical gears HG(A), HG(B) are positioned in helical and diagonal relation around the periphery of the gear. The phase of the gear tooth shifts with the rotation of the helical gears HG(A), HG(B) in ① and ② directions. To this end, electromagnetic pick-ups P(A), P(B) are provided on the respective helical gears HG(A), HG(B) so as to align in the same axis AX of the helical gears. The electromagnetic pick-ups P(A), P(B) detect the front ends of the gear tooth. Direction of the rotation is obtained from the pulse phase difference based on the two pulses detected at the electromagnetic pick-ups P(A), P(B). As best seen in FIG. 13B, when the helical gears HG(A), HG(B) rotate to the ① direction, the pulse detected at the electromagnetic pick-up P(B) shifts back from that detected at the electromagnetic pick-up P(A). In other words, the front end of the gear teeth of the helical gear HG(A) is detected before that of the gear teeth of the helical gear HG(B). Meanwhile, when the helical gears HG(A), HG(B) rotate to the ② direction, the pulse detected at the electromagnetic pick-up P(B) shifts forward to that detected at the electromagnetic pick-up P(A) (FIG. 13C). In other words, the front end of the gear teeth of the helical gear HG(A) is detected after that of the gear teeth of the helical gear HG(B). Direction of the rotation is therefore detected by the pulse phase difference. Supporting that the rotation in the ① direction indicates backward displacement of the vehicle, backward displacement is detected by the relative positions of the two pulses obtained from the electromagnetic pick-ups P(A), P(B) mentioned above. As long as having a phase difference, any known gears other than helical gears HG(A), HG(B) may be employed.

IV) A vehicle speed pulse is input and the vehicle is fully stopped before the input of the vehicle speed pulse. This is for the following reason. When the vehicle displaces from the fully stopped position, backward displacement (possible backward displacement) of the vehicle is detected and then driving force is switched to the strong creep condition so as to keep the vehicle against the slope. Although displacement of the vehicle is detected, judgement is not carried out to specify the direction as to whether the vehicle moves forward or backwards. When the vehicle stops on an up slope, the total amount of driving force in the weak creep condition (driving force is zero if the engine 1 is automatically stopped) and braking force resists the backward displacement force of the vehicle. However, since the greater inclination angle of the slope, the greater backward displacement force, the vehicle starts to displace forward (on a down slope) or backwards (on an up slope) with the displacement force derived from the vehicle s own weight being greater than the total amount of the driving force in the weak creep condition and the braking force. For this reason, when forward or backward displacement (i.e. displacement) of the vehicle is detected, driving force is switched from the weak creep condition to the strong creep condition so as to generate sufficient driving force against the slope. For the purpose of the detection that the vehicle completely stops, the vehicle speed pulse of zero is detected before a vehicle speed pulse is input. Displacement of the vehicle is detected even from one vehicle speed pulse input.

Driving force may be switched to the strong creep condition even if the vehicle displaces to the same direction as the driver's intention.

[Conditions for Automatically Actuating the Engine]

Figure 12B:
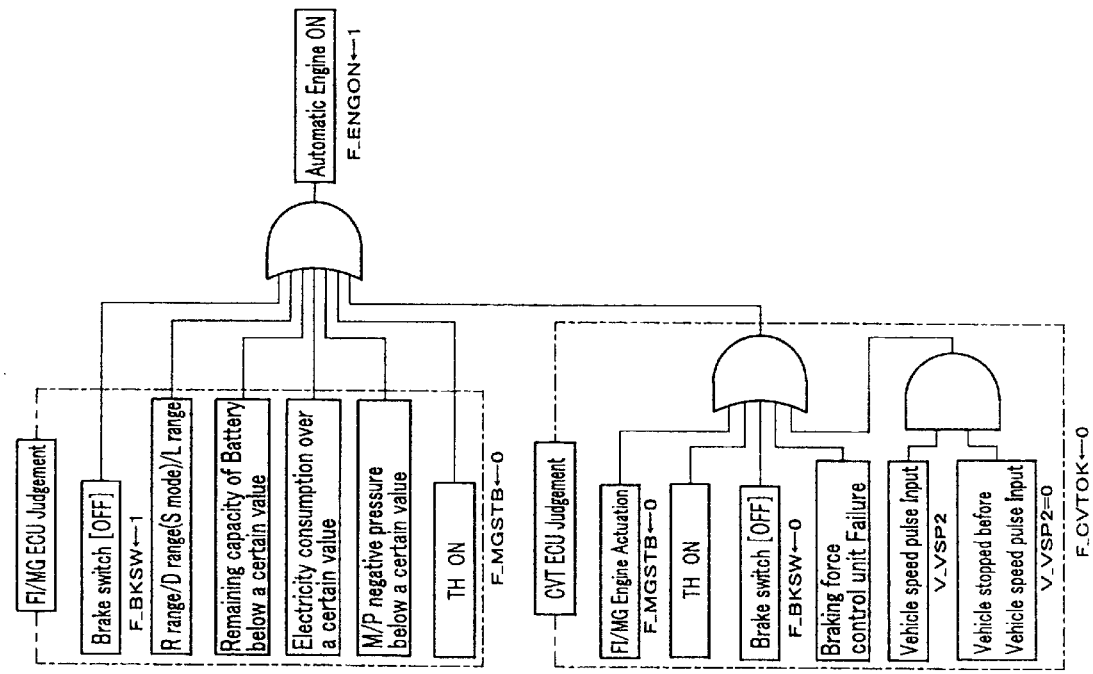
FIGS. 12A and 12B show the control loc for automatically actuating the engine. Here.
Figure 12A:
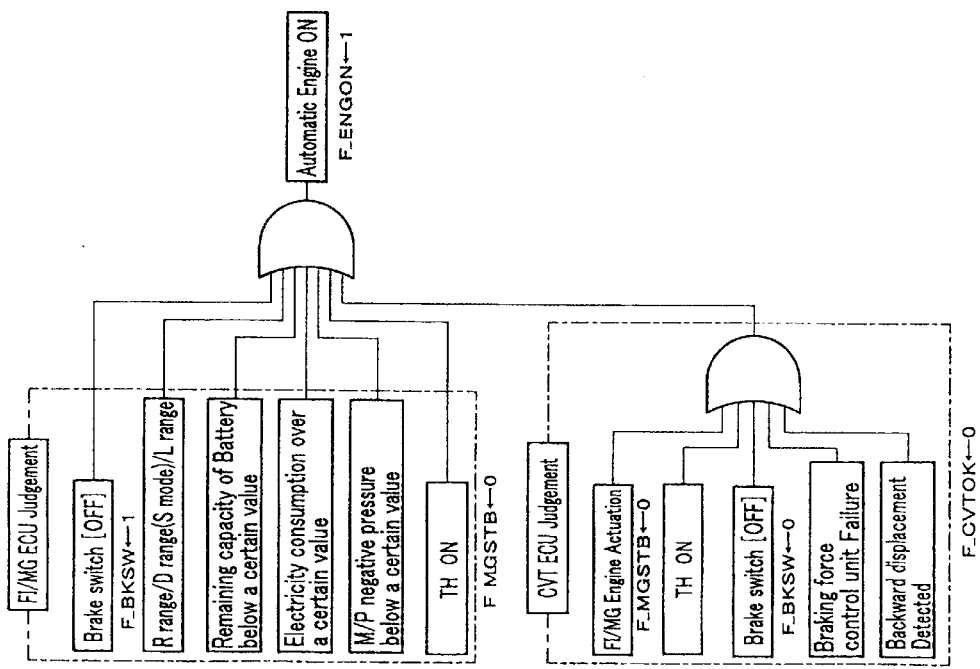

After automatically stopping the engine 1, the engine 1 is automatically restarted in the following conditions. When any of the following conditions shown in FIGS. 12A and 12B is satisfied, an automatic engine actuation order (F_ENGON) is transmitted and the engine 1 is automatically actuated. The automatic engine actuation is carried out by the driving motor stopping unit. Therefore, the following automatic engine actuation conditions are judged at the driving motor stopping unit. Specifically, the automatic engine actuation conditions are judged at the FI/MG ECU 4 and the CVT ECU 6. When the FI/MG ECU 4 judges that any of the following conditions I) to VI) is satisfied, F_MGSTB becomes 0. When the CVT ECU 6 judges that any of the following conditions VII) to XI) [or VII) to X) and XII)] is satisfied, F_CVTOK becomes 0. The first condition required for the automatic engine actuation order (shown in FIG. 12A) is the same as the second condition shown in FIG. 12B, except for the conditions XI) and XII) which are judged by the CVT ECU 6. Therefore, explanation refers merely to the difference as to the second condition thereof.

I) Depression of the brake pedal BP is released (Brake switch BSW is OFF). This is because judgement of the starting operation is carried out when the driver releases the brake pedal BP. When the driver releases the brake pedal BP in D range/D mode, it is considered that the driver initiates the starting operation. Therefore, the engine 1 is automatically actuated. Meanwhile, the driver releases the brake pedal BP in P range or N range so as to pull off and leave from the vehicle. In this circumstance, the engine 1 is automatically actuated in order to remind the driver not to leave from the vehicle without turning off the ignition switch.

II) Positioning switch PSW and Mode switch MSW select R range/D range (S mode)/L range. This is because the driver intends to start the vehicle quickly if the positioning switch PSW and the mode switch MSW select R range/D range (S mode)/L range after the engine 1 is stopped. Therefore, when the engine 1 is stopped with the transmission selected other than R range/D range (S mode)/L range and thereafter switched to R range/D range (S mode)/L range, the engine 1 is automatically actuated. III) Remaining capacity of the battery is below a certain value. This is because the engine 1 is not automatically actuated if the remaining capacity of the battery is not enough. The engine 1 is not stopped unless the remaining capacity of the battery is over a certain value. However, capacity of the battery may lower after the engine 1 is automatically stopped. In this case, the engine 1 is automatically actuated for the purpose of battery charge. The certain value is set to be higher than the critical battery capacity, below which the engine 1 is not actuated.

IV) Electricity consumption is over a certain value. While electricity consumers such as lights are working on, capacity of the battery decreases quickly. As a result, the engine 1 will not be restarted. For this reason, irrespective of the remaining capacity of the battery, the engine 1 is automatically actuated when the electricity consumption is over a certain value.

V) Negative pressure of the master power MP is below a certain value. The lower the negative pressure at the master power MP, the less braking force is obtained. Therefore, the engine 1 is restarted for securing sufficient braking force.

VI) Accelerator pedal is depressed (TH ON). This is because the driver is expecting driving force by the engine 1. Therefore, the engine 1 is automatically actuated when the accelerator pedal is depressed.

VII) Automatic engine actuation condition at FI/MG ECU 4 is satisfied. This is because the CVT ECU 6 also judges the automatic engine actuation conditions of the FV/MG ECU 4.

VIII) Accelerator pedal is depressed (TH ON). This is because the driver is expecting driving force by the engine 1. Therefore, the engine 1 is automatically actuated when the accelerator pedal is depressed.

IX) Depression of the brake pedal BP is released (Brake switch BSW is OFF). This is because judgement of the starting operation is carried out when the driver releases the brake pedal BP. When the driver releases the brake pedal BP in D range/D mode, it is considered that the driver initiates the starting operation. Therefore, the engine 1 is automatically actuated.

X) Braking force control unit BCU is out of order. When the braking force control unit BCU is out of order and braking force is not retained, the vehicle displaces backwards (forward) on a slope with the automatic engine stop operation. Therefore, when a solenoid valve SV of the braking force control unit BCU is out of order, the engine 1 is automatically actuated and the vehicle is kept in the strong creep condition. If failure is detected in the braking force control unit BCU after stopping the engine 1, the engine 1 is immediately actuated such that driving force of the vehicle is kept in the strong creep condition. This is because braking force may not be retained after releasing the brake pedal BP upon starting the vehicle. In other words, it is the strong creep condition that prevents the vehicle from unintentional backward displacement and facilitates a smooth starting operation of the vehicle.

XI) Backward displacement of the vehicle is detected. When the vehicle starts to displace backwards on a steep slope with the backward displacement force derived from the vehicle's own weight being greater than braking force, the vehicle is prevented from backward displacement by driving force of the engine 1. When the vehicle stops on an up slope, braking force resists the backward displacement force of the vehicle. However, since the greater inclination angle of the slope, the greater backward displacement force, the vehicle starts to displace backwards on the steep Slope with the backward displacement force being greater than the braking force. For this reason, when backward displacement of the vehicle is detected, driving force is switched from the engine stop condition to the strong creep condition in any circumstances so as to generate sufficient driving force against the slope. Since the way of detecting backward displacement of the vehicle has been referred in [Conditions Required for Strong Creep Order], further explanation will be omitted.

XII) A vehicle speed pulse is input and the vehicle is fully stopped before the input of the vehicle speed pulse. This is for the following reason. When the vehicle displaces from the fully stopped position, backward displacement (possible backward displacement) of the vehicle is detected and then the engine 1 is automatically actuated so as to generate driving force against the slope. Although displacement of the vehicle is detected, judgement is not carried out to specify the direction as to whether the vehicle moves forward or backwards. When the vehicle stops on an up slope with the engine 1 stopped, merely braking force resists the backward displacement force of the vehicle. However, since the greater inclination angle of the slope, the greater backward displacement force, the vehicle starts to displace forward (on a down slope) or backwards (on an up slope) with the displacement force derived from the vehicles own weight being greater than the braking force. For this reason, when forward or backward displacement (i.e. displacement) of the vehicle is detected, the engine 1 is automatically actuated so as to generate sufficient driving force in the strong creep condition. For the purpose of detection that the vehicle completely stops, the vehicle speed pulse of zero is detected before a vehicle speed pulse is input. Displacement of the vehicle is detected even from one vehicle speed pulse input.

Relations Between Vehicle Speed and Driving Force Value

As shown in FIG. 14, relations between vehicle speed and driving force value of the vehicle according to this embodiment will be described. Here, the vehicle stops in the strong creep condition.

FIG. 14A shows relations between vehicle speed and elapsed time. The vehicle accelerates by the driving force in the strong creep condition when depression of the brake pedal BP is released. During the acceleration of the vehicle, the number of engine speed is kept constant at 900 rpm (FIG. 14B). Meanwhile, the driving force value in the strong creep condition is controlled by the CVT ECU 6 so as to take the maximum value at the vehicle speed of 0 km/h and decrease as time passes, i.e., decrease in accordance with the increased vehicle speed (FIG. 14D). The driving force values at the vehicle speed of 5 km/h or more correspond to the strong creep condition for driving.

As shown in FIG. 14C, when the vehicle stops, speed ratio of the starting clutch is 0 and the starting clutch runs idle (slip ratio is 1). As the vehicle speed becomes faster, the speed ratio becomes closer to 1, leading to fewer idling of the starting clutch.

Time Chart During Running

Figure 15A:
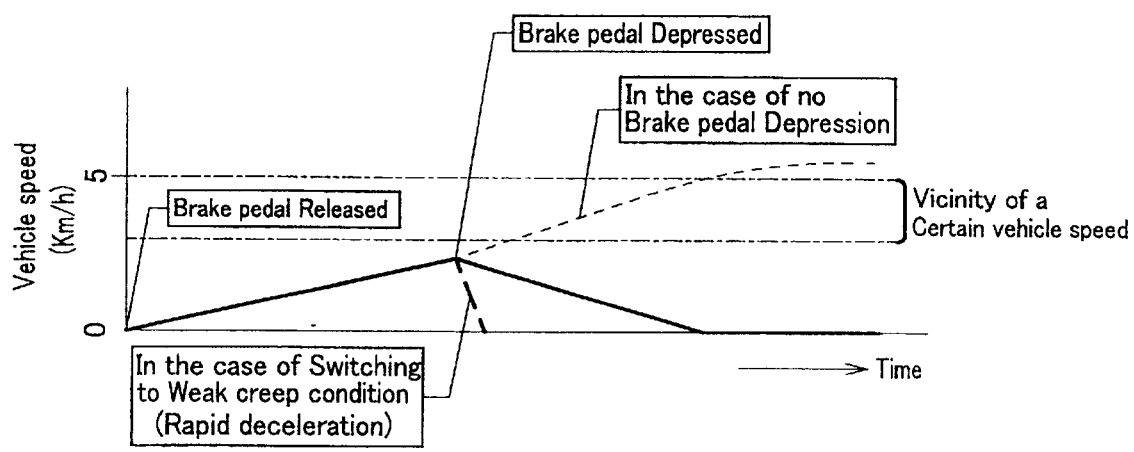
FIG. 15A shows a change of vehicle speed when the brake pedal is depressed at a vehicle speed less than the vicinity of a certain vehicle speed during idling running.
Figure 15B:
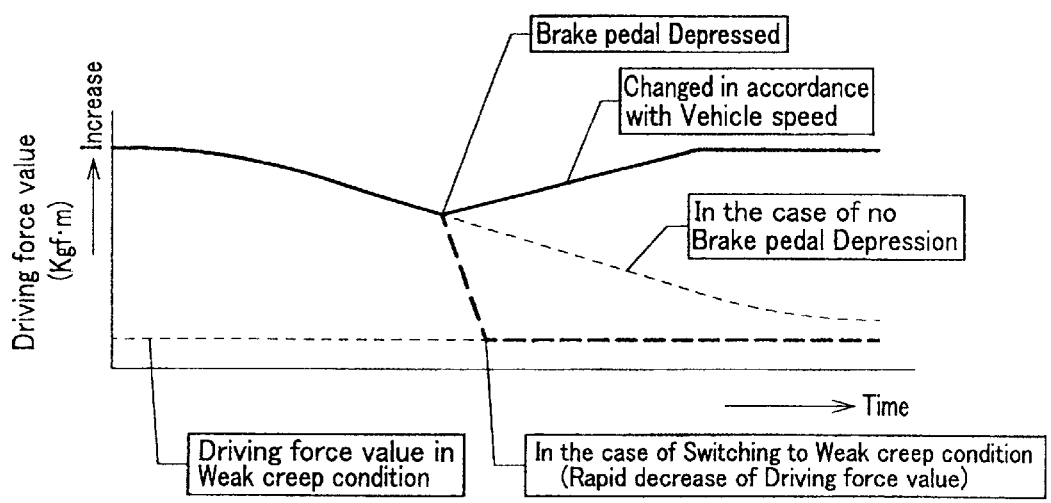
FIG. 15B shows a change of driving force value when the brake pedal is depressed at a vehicle speed less than the vicinity of a certain vehicle speed during idling running.
Figure 16A:
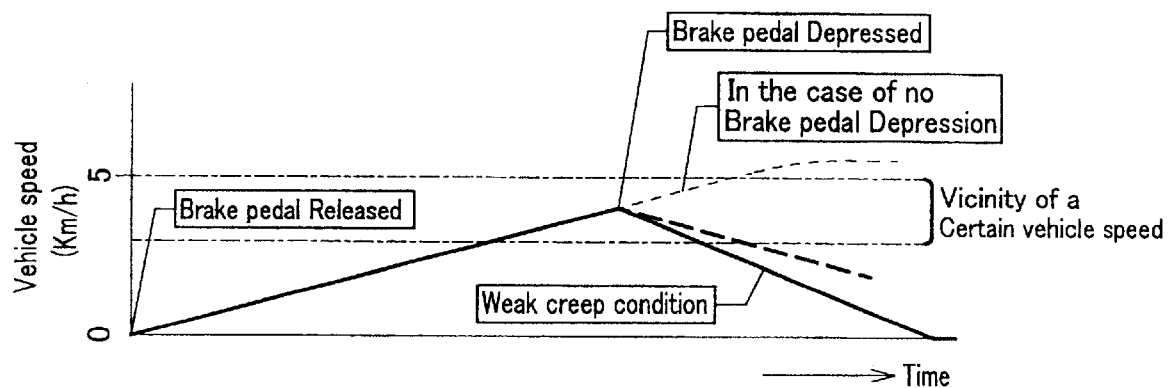
FIG. 16A shows a change of vehicle speed when the brake pedal is depressed in the vicinity of a certain vehicle speed during idling running.
Figure 16B:
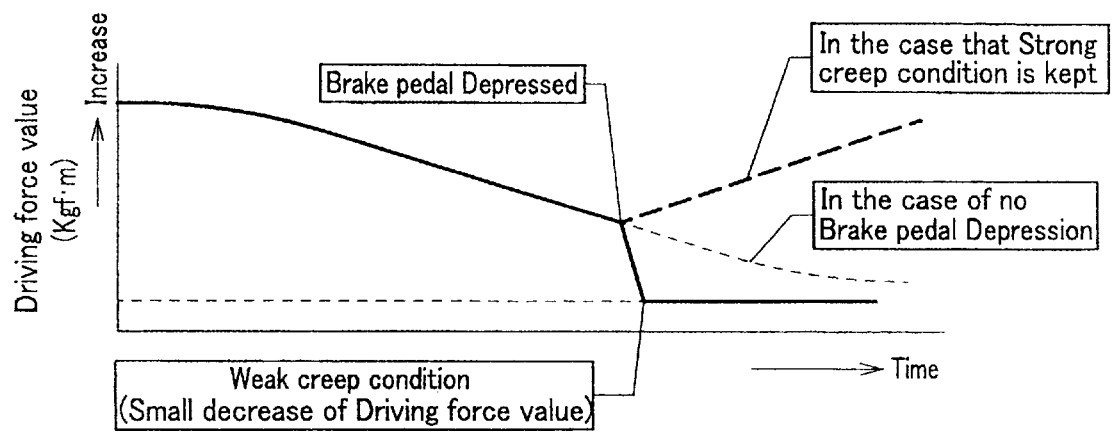
FIG. 16B shows a change of driving force value when the brake pedal is depressed in the vicinity of a certain vehicle speed during idling running.

With reference to FIGS. 15 and 16, change of the relations between vehicle speed and driving force value of the vehicle according to this embodiment will be described, in which the brake pedal is depressed during the idling running of the vehicle. Each of FIGS. 15A and 15B show a time chart during running, in which the brake pedal is depressed at a vehicle speed less than the vicinity of a certain vehicle speed. Meanwhile, each of FIGS. 16A and 16B show a time chart during running, in which the brake pedal is depressed in the vicinity of a certain vehicle speed.

[1. Depression of Brake Pedal at a Vehicle Speed Less than the Vicinity of a Certain Vehicle Speed]

With reference to FIG. 15, changes of vehicle speed and driving force value of the vehicle upon depression of the brake pedal BP will be described, in which the brake pedal BP is depressed at a vehicle speed less than the vicinity of a certain vehicle speed.

During the vehicle stops, the engine is not stopped and driving force is not reduced to the weak creep condition. In other words, the vehicle stops in the strong creep condition. The positioning switch PSW and the mode switch MSW of the vehicle are not changed from D range/D mode. Further, the braking force control unit BCU does not actuate. Here, the driver does not depress the accelerator pedal.

The driver first releases the brake pedal BP. The vehicle starts and accelerates by the driving force in the strong creep condition (FIG. 15A). The driver then tries to depress the brake pedal BP at a vehicle speed less than the vicinity of a certain vehicle speed. The vehicle speed range surrounded by the two dotted lines in FIG. 15A shows the vicinity of the certain vehicle speed.

In this vehicle, driving force is not decreased to the weak creep condition even if the brake pedal BP is depressed at a vehicle speed less than the vicinity of the certain vehicle speed. Therefore, the vehicle speed does not fall abruptly.

As shown in a thick phantom line in the figures, if switching to the weak creep condition upon depression of the brake pedal BP, the vehicle speed abruptly drops because of the braking force caused by the decreased driving force. As best seen in FIG. 15B, the difference of the driving force values (difference of the driving force) between the strong creep condition and the weak creep condition is great since the driving force value in the strong creep condition remains greater at a depression of the brake pedal BP. If the driving force is decreased in this circumstance, the vehicle speed abruptly drops because of greater braking force caused by the decreased driving force, resulting in unintentional strong deceleration of the vehicle.

As shown in a thick phantom line (FIG. 15B), the driving force control unit DCU increases the driving force value in the strong creep condition in the reverse of the decreasing vehicle speed.

[2. Depression of Brake Pedal in the Vicinity of a Certain Vehicle speed]

With reference to FIG. 16, changes of vehicle speed and driving force value of the vehicle upon depression of the brake pedal BP will be described, in which the brake pedal BP is depressed in the vicinity of a certain vehicle speed.

During the vehicle stops, the engine is not stopped and driving force is not reduced to the weak creep condition. In other words, the vehicle stops in the strong creep condition. The positioning switch PSW and the mode switch MSW of the vehicle are not changed from D range/D mode. Further, the braking force control unit BCU does not actuate. Here, the driver does not depress the accelerator pedal.

The driver first releases the brake pedal BP. The vehicle starts and accelerates by the driving force in the strong creep condition (FIG. 16A). The driver then tries to depress the brake pedal BP at a vehicle speed in the vicinity of the certain vehicle speed. The vehicle speed range surrounded by the two dotted lines in FIG. 16A shows the vicinity of the certain vehicle speed.

In this vehicle, driving force is decreased to the weak creep condition before the vehicle stops, only when the brake pedal is depressed at a vehicle speed in the vicinity of the certain vehicle speed.

As shown in FIG. 16B, even if switching to the weak creep condition upon depression of the brake pedal BP, the difference of the driving force values (difference of the driving force) between the strong creep condition and the weak creep condition is small since the driving force value in the strong creep condition is sufficiently small at a depression of the brake pedal BP. Therefore, the vehicle speed does not abruptly drop even if the driving force is switched to the weak creep condition at a depression of the brake pedal BP. A thick phantom line shown in FIG. 16A indicates vehicle speed when the strong creep condition is kept.

As mentioned above, if the driving force is decreased in the vicinity of a certain vehicle speed, the vehicle speed does not drop abruptly. Further, if the vehicle stops with the driving force decreased, vibration of the vehicle while stopping the vehicle is prevented and improved fuel consumption is achieved.

As shown in a thick phantom line (FIG. 16B), the driving force control unit DCU increases the driving force value in the strong creep condition in the reverse of the decreasing vehicle speed.

According to the present invention, the driving force value in the greater driving force condition (strong creep condition) is changed so that switching to the smaller driving force condition (weak creep condition) is permitted only when the driving force value is small before stopping the vehicle. Therefore, the driver does not receive unintentional strong deceleration since (1) the decreasing amount of the driving force upon switching becomes smaller, and (2) even in the strong creep condition, the brake pedal BP is depressed while the driving force value is small, and thus the driver's depression force of the brake pedal is weak. Further, since switching from the strong creep condition to the weak creep condition is not carried out except in the vicinity of a certain vehicle speed, at which the driving force value is great, driving making use of creep force, such as steering operations at a garage will be smoothly performed.

While the present invention has been described by way of specific embodiments and examples, it is to be understood that changes and variations may be made without departing from the spirit or scope of the following claims.

The "vehicle speed" in the phrase "the driving force value in the greater condition is changed according to the vehicle speed" is not limited merely to vehicle speed itself, but includes other equivalent parameters, such as speed ratio of the starting clutch.

Similarly, switching of the driving force to the smaller condition may be carried out not only in consideration of the vehicle speed itself, but also by the speed ratio of the starting clutch as a parameter.

Further, in the vehicle according to the present invention, the driving motor is not restricted merely to an engine or a motor. Similarly, the transmission is not restricted to a particular type such as CVT or an automatic transmission with a fluid type torque converter.

What is claimed is:

1. A driving force control unit for a vehicle, said unit operative to:

allow transmission of driving force from a driving motor to driving wheels, irrespective of releasing an accelerator pedal, at a certain or lower vehicle speed when a transmission is selected to a running range; and switch the magnitude of the driving force, while the accelerator pedal is in a released state at a vehicle speed no more than the certain vehicle speed, between a greater condition and a smaller condition in accordance with depression of a brake pedal so that the driving force is made lower for a depression of the brake pedal than for a release of the brake pedal, wherein:

at a predetermined or lower vehicle speed, a driving force value in said greater condition is changed according to the vehicle speed;

the change of the driving force value in said greater condition is such that that the driving force value becomes smaller as the vehicle speed changes from a speed corresponding to the maximum driving force value to said predetermined vehicle speed; and further switching of said driving force, before stopping the vehicle, from said greater condition to said smaller condition is permitted only in the vicinity of said predetermined vehicle speed.

2. A driving force control unit for a vehicle, said unit operative to:

allow transmission of driving force from a driving motor to driving wheels, irrespective of releasing an accelerator pedal, at a certain or lower vehicle speed when a transmission is selected to a running range; and switch the magnitude of the driving force, while the accelerator pedal is in a released state at a vehicle speed no more than the certain vehicle speed, between a greater condition and a smaller condition in accordance with depression of a brake pedal so that the driving force is made lower for a depression of the brake pedal than for a release of the brake pedal, wherein the driving force control unit further comprises:

means for changing the driving force value in said greater condition, at a predetermined or lower vehicle speed, so that the driving force value is changed according to the vehicle speed, the change being such that the driving force value becomes smaller as the vehicle speed changes from a speed corresponding to the maximum driving force value to said predetermined vehicle speed; and means for permitting switching said driving force, before stopping the vehicle, from said greater condition to said smaller condition only when the vehicle speed is in the vicinity of said predetermined vehicle speed.

3. The driving force control unit according to claim 1, wherein said unit is further operative to switch the magnitude of the driving force to a middle creep condition, said middle creep condition allowing transmission of driving force that is greater than that in said smaller condition but smaller than that in said greater condition.

4. The driving force control unit according to claim 2, wherein said unit is further operative to switch the magnitude of the driving force to a middle creep condition, said middle creep condition allowing transmission of driving force that is greater than that in said smaller condition but smaller than that in said greater condition.

\* \* \* \* \*